(12) United States Patent
Sinclair et al.

(10) Patent No.: US 7,949,845 B2
(45) Date of Patent: *May 24, 2011

(54) INDEXING OF FILE DATA IN REPROGRAMMABLE NON-VOLATILE MEMORIES THAT DIRECTLY STORE DATA FILES

(75) Inventors: Alan W. Sinclair, Falkirk (GB); Barry Wright, Edinburgh (GB)

(73) Assignee: SanDisk Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/459,255

(22) Filed: Jul. 21, 2006

(65) Prior Publication Data

US 2007/0033375 A1 Feb. 8, 2007

Related U.S. Application Data

(60) Provisional application No. 60/705,388, filed on Aug. 3, 2005, provisional application No. 60/746,742, filed on May 8, 2006.

(51) Int. Cl.
*G06F 12/00* (2006.01)
*G06F 13/00* (2006.01)
*G06F 13/28* (2006.01)

(52) U.S. Cl. ............... 711/170; 711/103; 711/4

(58) Field of Classification Search .......... 711/103, 711/4, 170
See application file for complete search history.

(56) References Cited

U.S. PATENT DOCUMENTS

| | | | |
|---|---|---|---|
| 4,800,520 A | 1/1989 | Iijima | |
| 4,802,117 A | 1/1989 | Chrosny et al. | |
| 5,226,155 A | 7/1993 | Iijima | |
| 5,341,339 A | 8/1994 | Wells | |
| 5,369,754 A | 11/1994 | Fandrich et al. | |
| 5,388,083 A | 2/1995 | Assar et al. | |
| 5,404,485 A * | 4/1995 | Ban | 711/202 |
| 5,570,315 A | 10/1996 | Tanaka et al. | |
| 5,592,662 A | 1/1997 | Sawada et al. | |
| 5,592,669 A * | 1/1997 | Robinson et al. | 707/206 |
| 5,602,987 A | 2/1997 | Harari et al. | |

(Continued)

FOREIGN PATENT DOCUMENTS

DE 10234971 A1 2/2004

(Continued)

OTHER PUBLICATIONS

Chiang, Mei-Ling et al., "Data Management in a Flash Memory Based Storage Server", National Chiao-Tung University, Hsinchu, Taiwan, Dept. Of Computer and Information Science, 8 pages.

(Continued)

*Primary Examiner* — Stephen C Elmore
*Assistant Examiner* — Mark A Giardino, Jr.
(74) *Attorney, Agent, or Firm* — Davis Wright Tremaine LLP

(57) ABSTRACT

Host system data files are written directly to a large erase block flash memory system with a unique identification of each file and offsets of data within the file but without the use of any intermediate logical addresses or a virtual address space for the memory. Directory information of where the files are stored in the memory is maintained within the memory system by its controller, rather than by the host. Each data file is uniquely identified in a file directory, which points to entries in a file index table (FIT) of data groups that make up the file and their physical storage locations in the memory.

17 Claims, 20 Drawing Sheets

U.S. PATENT DOCUMENTS

| | | | |
|---|---|---|---|
| 5,619,690 A | 4/1997 | Matsumani et al. | |
| 5,628,014 A * | 5/1997 | Cecchini et al. | 707/205 |
| 5,634,050 A | 5/1997 | Krueger et al. | |
| 5,668,968 A * | 9/1997 | Wu | 711/3 |
| 5,774,397 A | 6/1998 | Endoh et al. | |
| 5,799,168 A | 8/1998 | Ban | |
| 5,809,558 A | 9/1998 | Matthews et al. | |
| 5,832,493 A | 11/1998 | Marshall et al. | |
| 5,867,641 A | 2/1999 | Jenett | |
| 5,896,393 A | 4/1999 | Yard et al. | |
| 5,907,854 A | 5/1999 | Kerns | |
| 5,928,347 A | 7/1999 | Jones | |
| 5,933,846 A | 8/1999 | Endo | |
| 5,937,425 A | 8/1999 | Ban | |
| 5,966,047 A | 10/1999 | Anderson et al. | 327/565 |
| 5,966,720 A | 10/1999 | Itoh et al. | |
| 5,987,478 A | 11/1999 | See et al. | |
| 5,996,047 A * | 11/1999 | Peacock | 711/118 |
| 6,014,724 A | 1/2000 | Jenett | |
| 6,021,415 A | 2/2000 | Cannon et al. | |
| 6,038,636 A * | 3/2000 | Brown et al. | 711/103 |
| 6,046,935 A | 4/2000 | Takeuchi et al. | |
| 6,069,827 A | 5/2000 | Sinclair | |
| 6,145,069 A | 11/2000 | Dye | |
| 6,148,354 A | 11/2000 | Ban et al. | |
| 6,216,204 B1 | 4/2001 | Thiriet | |
| 6,226,728 B1 | 5/2001 | See et al. | |
| 6,256,690 B1 | 7/2001 | Carper | |
| 6,275,804 B1 | 8/2001 | Carl et al. | |
| 6,279,069 B1 | 8/2001 | Robinson et al. | |
| 6,373,746 B1 | 4/2002 | Takeuchi et al. | |
| 6,385,690 B1 | 5/2002 | Iida et al. | |
| 6,412,040 B2 | 6/2002 | Hasbun et al. | |
| 6,426,893 B1 | 7/2002 | Conley et al. | |
| 6,446,140 B1 | 9/2002 | Nozu | |
| 6,456,528 B1 | 9/2002 | Chen | |
| 6,467,015 B1 | 10/2002 | Nolan et al. | |
| 6,467,021 B1 | 10/2002 | Sinclair | |
| 6,477,616 B1 | 11/2002 | Takahashi | |
| 6,480,935 B1 | 11/2002 | Carper et al. | |
| 6,484,937 B1 | 11/2002 | Devaux et al. | |
| 6,490,649 B2 | 12/2002 | Sinclair | |
| 6,493,811 B1 | 12/2002 | Blades et al. | |
| 6,522,580 B2 | 2/2003 | Chen et al. | |
| 6,535,949 B1 | 3/2003 | Parker | |
| 6,542,407 B1 | 4/2003 | Chen et al. | |
| 6,547,150 B1 | 4/2003 | Deo et al. | |
| 6,567,307 B1 | 5/2003 | Estakhri | |
| 6,598,114 B2 | 7/2003 | Funakoshi | |
| 6,604,168 B2 | 8/2003 | Ogawa | |
| 6,668,336 B2 | 12/2003 | Lasser | |
| 6,681,239 B1 | 1/2004 | Munroe et al. | |
| 6,715,027 B2 | 3/2004 | Kim et al. | 711/103 |
| 6,763,424 B2 | 7/2004 | Conley | |
| 6,766,432 B2 | 7/2004 | Saltz | |
| 6,771,536 B2 | 8/2004 | Li et al. | |
| 6,772,955 B2 | 8/2004 | Yoshimoto et al. | |
| 6,779,063 B2 | 8/2004 | Yamamoto | |
| 6,781,877 B2 | 8/2004 | Cernea et al. | |
| 6,823,417 B2 | 11/2004 | Spencer | |
| 6,834,331 B1 | 12/2004 | Liu | |
| 6,886,083 B2 | 4/2005 | Murakami | |
| 6,895,464 B2 | 5/2005 | Chow et al. | |
| 6,898,662 B2 | 5/2005 | Gorobets | |
| 6,925,007 B2 | 8/2005 | Harari et al. | |
| 6,938,116 B2 | 8/2005 | Kim et al. | |
| 7,032,065 B2 | 4/2006 | Gonzalez et al. | |
| 7,092,911 B2 | 8/2006 | Yokota et al. | |
| 7,426,606 B2 | 9/2008 | Chu | 711/103 |
| 2002/0099904 A1 | 7/2002 | Conley | |
| 2002/0103987 A1 | 8/2002 | Jaffrey | |
| 2002/0116569 A1 | 8/2002 | Kim et al. | 711/103 |
| 2003/0088812 A1 | 5/2003 | Lasser | |
| 2003/0109093 A1 | 6/2003 | Harari et al. | |
| 2003/0147278 A1 | 8/2003 | Tanaka et al. | |
| 2003/0158836 A1* | 8/2003 | Venkatesh et al. | 707/1 |
| 2003/0229753 A1 | 12/2003 | Hwang | |
| 2003/0229769 A1 | 12/2003 | Montemayor | |
| 2004/0019716 A1 | 1/2004 | Bychkov et al. | |
| 2004/0073727 A1 | 4/2004 | Moran et al. | |
| 2004/0103241 A1 | 5/2004 | Chang et al. | |
| 2004/0157638 A1 | 8/2004 | Moran et al. | |
| 2004/0248612 A1 | 12/2004 | Lee et al. | |
| 2005/0141312 A1 | 6/2005 | Sinclair et al. | |
| 2005/0141313 A1 | 6/2005 | Gorobets et al. | |
| 2005/0144357 A1 | 6/2005 | Sinclair | |
| 2005/0144358 A1 | 6/2005 | Conley et al. | |
| 2005/0144360 A1 | 6/2005 | Bennett et al. | |
| 2005/0144363 A1 | 6/2005 | Sinclair | |
| 2005/0144365 A1 | 6/2005 | Gorobets et al. | |
| 2005/0144367 A1 | 6/2005 | Sinclair | |
| 2005/0162923 A1 | 7/2005 | Guterman | |
| 2005/0166087 A1 | 7/2005 | Gorobets | |
| 2005/0226055 A1 | 10/2005 | Guterman | |
| 2006/0020744 A1 | 1/2006 | Sinclair et al. | |
| 2006/0020745 A1 | 1/2006 | Conley et al. | |
| 2006/0031593 A1 | 2/2006 | Sinclair | |
| 2006/0155920 A1 | 7/2006 | Smith et al. | |
| 2006/0155921 A1 | 7/2006 | Gorobets et al. | |
| 2006/0155922 A1 | 7/2006 | Gorobets et al. | |
| 2006/0161724 A1 | 7/2006 | Bennett et al. | |
| 2006/0161728 A1 | 7/2006 | Bennett et al. | |
| 2006/0168395 A1 | 7/2006 | Deng et al. | |
| 2006/0184718 A1 | 8/2006 | Sinclair et al. | |
| 2006/0184719 A1 | 8/2006 | Sinclair | |
| 2006/0184720 A1* | 8/2006 | Sinclair et al. | 711/103 |
| 2006/0184722 A1 | 8/2006 | Sinclair | |
| 2006/0184723 A1 | 8/2006 | Sinclair et al. | |
| 2007/0030734 A1 | 2/2007 | Sinclair et al. | |
| 2007/0033323 A1 | 2/2007 | Gorobets | |
| 2007/0033324 A1 | 2/2007 | Sinclair | |
| 2007/0033326 A1 | 2/2007 | Sinclair | |
| 2007/0033328 A1 | 2/2007 | Sinclair et al. | |
| 2007/0033329 A1 | 2/2007 | Sinclair et al. | |
| 2007/0033330 A1 | 2/2007 | Sinclair et al. | |
| 2007/0033331 A1 | 2/2007 | Sinclair et al. | |
| 2007/0033332 A1 | 2/2007 | Sinclair et al. | |
| 2007/0033374 A1 | 2/2007 | Sinclair et al. | |
| 2007/0033376 A1 | 2/2007 | Sinclair et al. | |
| 2007/0033377 A1 | 2/2007 | Sinclair et al. | |
| 2007/0033378 A1 | 2/2007 | Sinclair et al. | |
| 2007/0086260 A1 | 4/2007 | Sinclair | |
| 2007/0088904 A1 | 4/2007 | Sinclair | |
| 2007/0186032 A1 | 8/2007 | Sinclair et al. | |

FOREIGN PATENT DOCUMENTS

| | | |
|---|---|---|
| EP | 0 852 765 B1 | 9/2001 |
| EP | 1100001 B1 | 8/2003 |
| EP | 1 571 557 A1 | 9/2005 |
| JP | 62-283496 A | 12/1987 |
| JP | H10-069420 A | 3/1998 |
| JP | H10-275482 A | 10/1998 |
| JP | 2002-251310 A | 9/2002 |
| JP | 2002-366423 A | 12/2002 |
| JP | 2003-208352 A | 7/2003 |
| JP | 2004-526233 A | 8/2004 |
| JP | 2004-310573 A | 11/2004 |
| JP | 2005-122439 A | 5/2005 |
| JP | 2005-174414 | 6/2005 |
| JP | 2006-515086 A | 5/2006 |
| JP | 2007-520804 A | 7/2007 |
| JP | H10-326227 A | 12/2008 |
| JP | 2009-509276 | 3/2009 |
| WO | WO 97/12324 * | 4/1997 |
| WO | WO 00/49488 A1 | 8/2000 |
| WO | WO 02/29575 A2 | 4/2002 |
| WO | WO 2004/012027 A2 | 2/2004 |
| WO | WO 2004/040453 A2 | 5/2004 |
| WO | WO 2004/040455 A2 | 5/2004 |
| WO | WO 2004/046937 A1 | 6/2004 |
| WO | WO 2005/041206 | 5/2005 |
| WO | WO 2005/066793 A1 | 7/2005 |

OTHER PUBLICATIONS

Kim, Han-Joon et al., "A New Flash Memory Management for Flash Storage System", Computer Software and Applications Conference, 1999. Compsac '99 Proceedings. IEEE Comput. Soc., pp. 284-289.

Rankl, Wolfgang et al., "Smart Card Handbook, Third Edition (translated by Kenneth Cox)", John Wiley & Sons, Ltd., 2004, pp. 52-93, 233-369, and 435-490.

Ban, Amir, "Inside Flash File Systems—Part I", IC Card Systems & Design, Jul./Aug. 1993, pp. 15-16, 18.

Ban, Amir, "Inside Flash File Systems—Part II", IC Card Systems & Design, Sep./Oct. 1993, pp. 21-24.

Intel AP-686 Application Note, "Flash File System Selection Guide," Dec. 1998, 18 pages.

Ban, Amir, "Local Flash Disks: Two Architectures Compared," M-Systems Flash Disk Pioneers, White Paper, Rev. 1.0, Aug. 2001, 9 pages.

Chiang et al., "Cleaning Policies in Mobile Computers Using Flash Memory," *Journal of Systems & Software*, vol. 48, 1999, pp. 213-231.

Imamiya et al., "A 125-mm2 1-Gb NAND Flash Memory with 10-Mbyte/s Program Speed" Nov. 2002, IEEE Journal of Solid-State Circuits, vol. 37, No. 11, pp. 1493-1501.

Kjelso et al., "Memory Management in Flash-Memory Disks with Data Compression," 1995, Springer-Verlag, pp. 399-413.

Kim et al., "A Space-Efficient Flash Translation Layer for CompactFlash Systems," *IEEE Transactions on Consumer Electronics*, vol. 48, No. 2, May 2002, pp. 366-375.

Lim et al., "An Efficient NAND Flash File System for Flash Memory Storage," *IEEE Transactions on Computer*, vol. 55, No. 7, Jul. 1, 2006, pp. 906-912.

PNY Technologies Attache Flash Product, http://web.archive.org/web/20030704092223/http://www.pny.com/products/flash/attache.asp.07/04/2003. pp. 1-2.

Wu et al., "eNVy: A Non-Volatile, Main Memory Storage System," *ACM Sigplan Notices*, vol. 29, No. 11, Nov. 1, 2994, pp. 86-97.

EPO/ISA, "Notification of Transmittal of the International Search Report and the Written Opinion of the International Searching Authority, or the Declaration," corresponding in International Patent Application No. PCT/US2006/030098, mailed Sep. 7, 2007, 11 pages.

USPTO, "Office Action," mailed in related U.S. Appl. No. 11/459,246 on Mar. 23, 2009, 32 pages.

First Office Action for Chinese Application No. 200680028166.8 dated Nov. 23, 2010, 15 pages.

* cited by examiner

PRIOR ART SYSTEM

DIRECT DATA FILE STORAGE SYSTEM

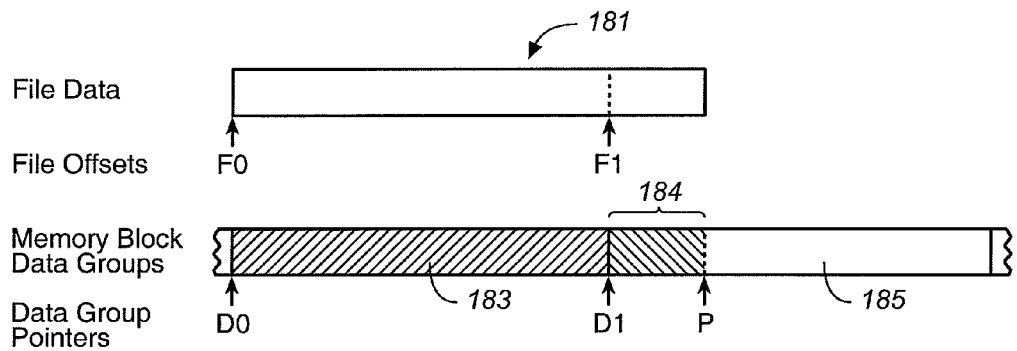
FIG. 13A Write
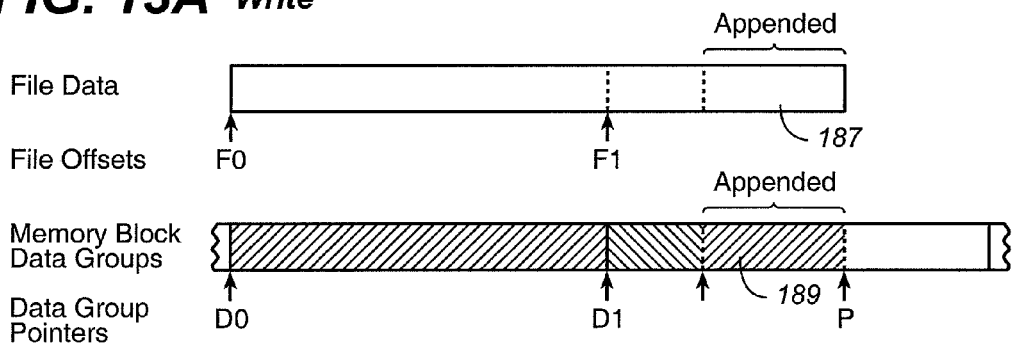
FIG. 13B Write
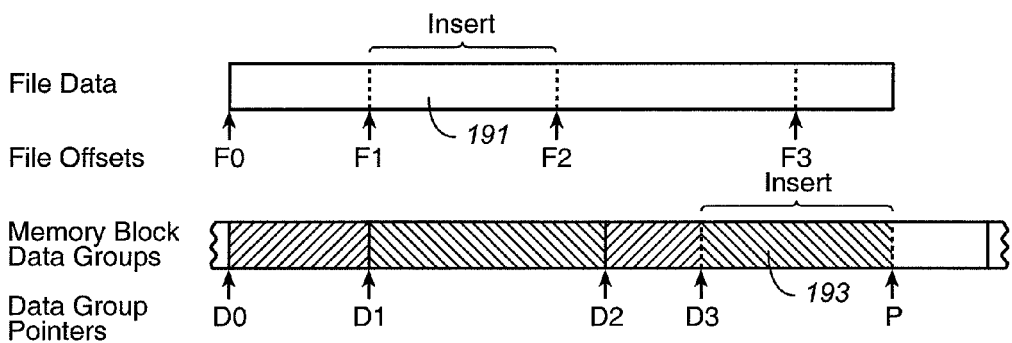
FIG. 13C Insert
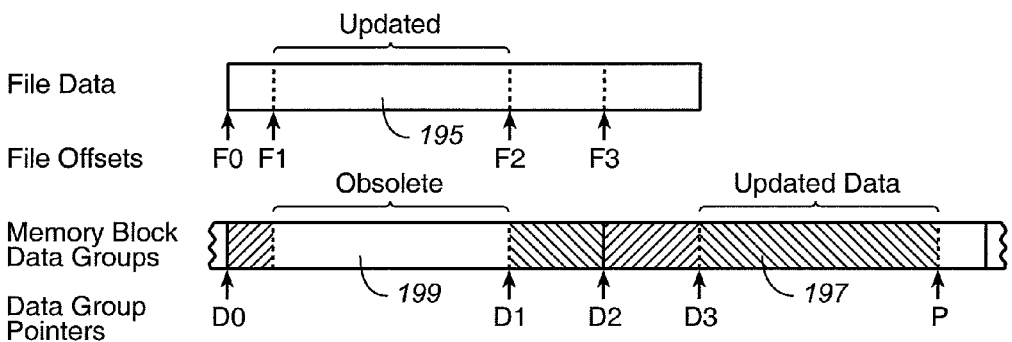
FIG. 13D Update

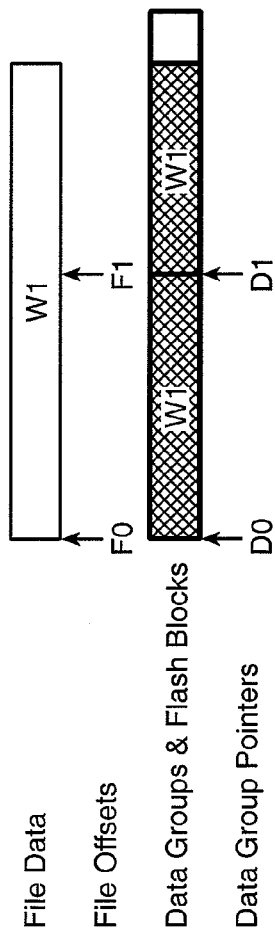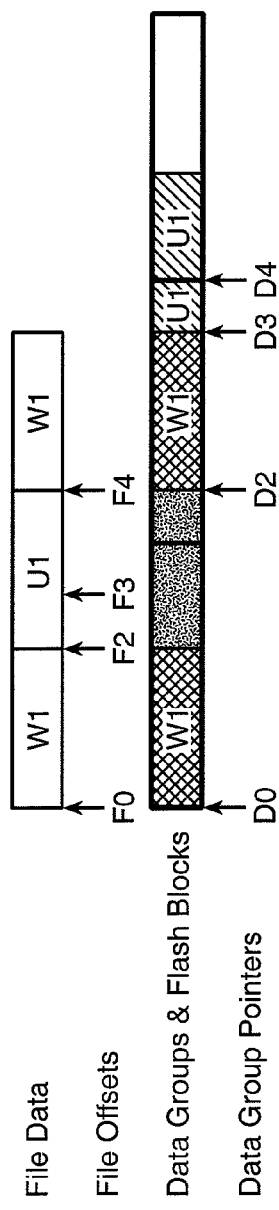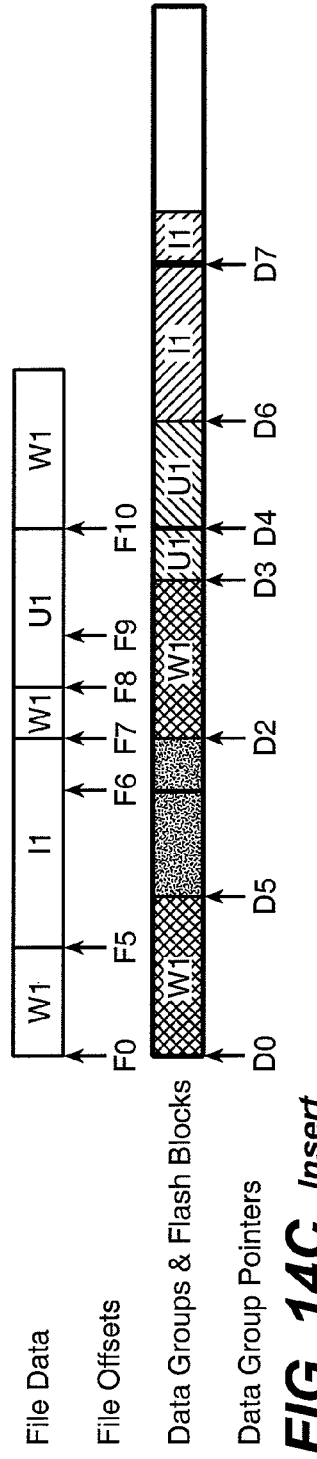
FIG. 14A Write  FIG. 14B Update  FIG. 14C Insert

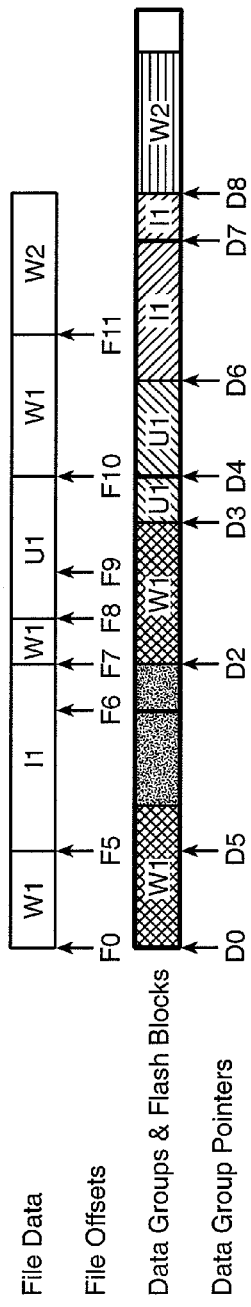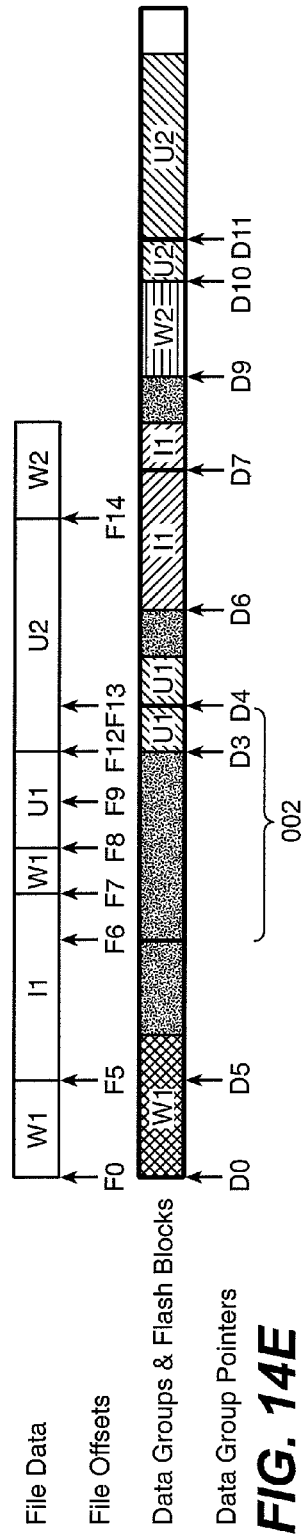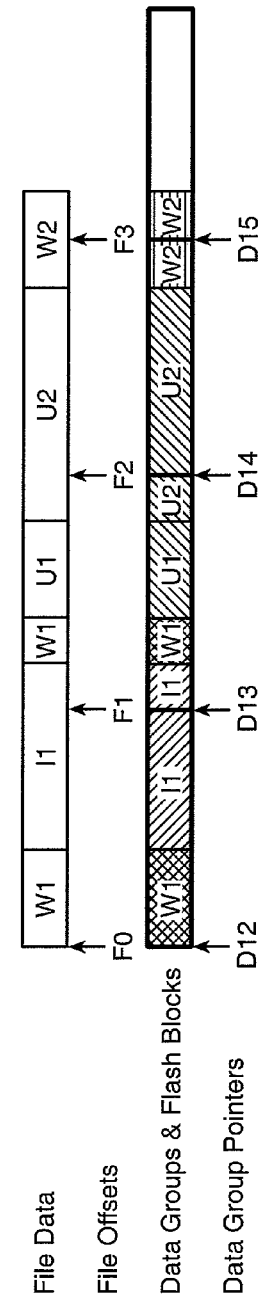
FIG. 14D Update   FIG. 14E   FIG. 15

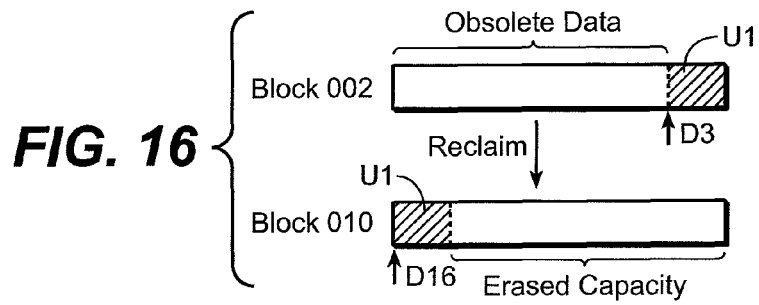

File Index Table (FIT)

| | OFFSET | BLOCK | BYTE | LENGTH |
|---|---|---|---|---|
| Time 0 (Fig. 14A) | F0<br>F1 | 001<br>002 | D0<br>D1 | —<br>— |
| Time 2 (Fig. 14C) | F0<br>F5<br>F6<br>F7<br>F8<br>F9<br>F10 | 001<br>003<br>004<br>001<br>002<br>003<br>002 | D0<br>D6<br>D7<br>D5<br>D3<br>D4<br>D2 | —<br>—<br>—<br>—<br>—<br>—<br>— |
| Time 4 (Fig. 14E) | F0<br>F5<br>F6<br>F7<br>F8<br>F9<br>F12<br>F13<br>F14 | 001<br>003<br>004<br>001<br>002<br>003<br>004<br>005<br>004 | D0<br>D6<br>D7<br>D5<br>D3<br>D4<br>D10<br>D11<br>D9 | —<br>—<br>—<br>—<br>—<br>—<br>—<br>—<br>— |
| Time X (Fig. 15) | F0<br>F1<br>F2<br>F3 | 006<br>007<br>008<br>009 | D12<br>D13<br>D14<br>D15 | —<br>—<br>—<br>— |
| Time Y (Fig. 16) | F0<br>F5<br>F6<br>F7<br>F8<br>F9<br>F12<br>F13<br>F14 | 001<br>003<br>004<br>001<br>010<br>003<br>004<br>005<br>004 | D0<br>D6<br>D7<br>D5<br>D16<br>D4<br>D10<br>D11<br>D9 | —<br>—<br>—<br>—<br>—<br>—<br>—<br>—<br>— |

INDEXING OF FILE DATA IN REPROGRAMMABLE NON-VOLATILE MEMORIES THAT DIRECTLY STORE DATA FILES

CROSS-REFERENCE TO RELATED PATENTS AND APPLICATIONS

The benefit is claimed of the following U.S. provisional patent applications of Alan W. Sinclair and Barry Wright: application No. 60/705,388, filed Aug. 3, 2005, and application No. 60/746,742, filed May 8, 2006.

This application is also related to U.S. non-provisional patent application Ser. Nos. 11/060,174, publication no. 2006/0184718 A1, Ser. No. 11/060,248, publication no. 2006/0184719 A1, and Ser. No. 11/060,249, publication no. 2006/0184720 A1, all filed on Feb. 16, 2005, naming as inventors either Alan W. Sinclair alone or with Peter J. Smith.

This application is further related to the following U.S. patent applications of Alan W. Sinclair and Barry Wright: non-provisional application Ser. Nos. 11/382,224, publication no. 2007/0033328 A1, Ser. No. 11/382,232, publication no. 2007/0030734 A1, both filed May 8, 2006, provisional application No. 60/746,740, filed May 8, 2006, non-provisional application entitled "NonVolatile Memory With Block Management," application Ser. No. 11/459,260 and publication no. 2007/0033331 A1, non-provisional application entitled "Methods of Managing Blocks in NonVolatile Memory," application Ser. No. 11/459,268 and publication no. 2007/0033332 A1, and a non-provisional application entitled "Reprogrammable Non-Volatile Memory Systems With Indexing of Directly Stored Data Files," application Ser. No. 11/459,246 and publication no. 2007/0033374 A1, all three filed Jul. 21, 2006.

GENERAL BACKGROUND

This application relates to the operation of re-programmable non-volatile memory systems such as semiconductor flash memory, and, more specifically, to the management of the interface between a host device and the memory.

There are two primary techniques by which data communicated through external interfaces of host systems, memory systems and other electronic systems are addressed. In one of them, addresses of data files generated or received by the system are mapped into distinct ranges of a continuous logical address space established for the system. The extent of the address space is typically sufficient to cover the full range of addresses that the system is capable of handling. In one example, magnetic disk storage drives communicate with computers or other host systems through such a logical address space. This address space has an extent sufficient to address the entire data storage capacity of the disk drive. In the second of the two techniques, data files generated or received by an electronic system are uniquely identified and their data logically addressed by offsets within the file. A form of this addressing method is used between computers or other host systems and a removable memory card known as a "Smart Card." Smart Cards are typically used by consumers for identification, banking, point-of-sale purchases, ATM access and the like.

In an early generation of commercial flash memory systems, a rectangular array of memory cells were divided into a large number of groups of cells that each stored the amount of data of a standard disk drive sector, namely 512 bytes. An additional amount of data, such as 16 bytes, are also usually included in each group to store an error correction code (ECC) and possibly other overhead data relating to the user data and/or to the memory cell group in which the associated user data are stored. The memory cells in each such group are the minimum number of memory cells that are erasable together. That is, the erase unit is effectively the number of memory cells that store one data sector and any overhead data that is included. Examples of this type of memory system are described in U.S. Pat. Nos. 5,602,987 and 6,426,893. It is a characteristic of flash memory that the memory cells are erased prior to re-programming them with data.

Flash memory systems are most commonly provided in the form of a memory card or flash drive that is removably connected with a variety of hosts such as a personal computer, a camera or the like, but may also be embedded within such host systems. When writing data to the memory, the host typically assigns unique logical addresses to sectors, clusters or other units of data within a continuous virtual address space of the memory system. Like a disk operating system (DOS), the host writes data to, and reads data from, addresses within the logical address space of the memory system. A controller within the memory system translates logical addresses received from the host into physical addresses within the memory array, where the data are actually stored, and then keeps track of these address translations. The data storage capacity of the memory system is at least as large as the amount of data that is addressable over the entire logical address space defined for the memory system.

In later generations of flash memory systems, the size of the erase unit was increased to a block of enough memory cells to store multiple sectors of data. Even though host systems with which the memory systems are connected may program and read data in small minimum units such as sectors, a large number of sectors are stored in a single erase unit of the flash memory. It is common for some sectors of data within a block to become obsolete as the host updates or replaces logical sectors of data. Since the entire block must be erased before any data stored in the block can be overwritten, new or updated data are typically stored in another block that has been erased and has remaining capacity for the data. This process leaves the original block with obsolete data that take valuable space within the memory. But that block cannot be erased if there are any valid data remaining in it.

Therefore, in order to better utilize the memory's storage capacity, it is common to consolidate or collect valid partial block amounts of data by copying them into an erased block so that the block(s) from which these data are copied may then be erased and their entire storage capacity reused. It is also desirable to copy the data in order to group data sectors within a block in the order of their logical addresses since this increases the speed of reading the data and transferring the read data to the host. If such data copying occurs too frequently, the operating performance of the memory system can be degraded. This particularly affects operation of memory systems where the storage capacity of the memory is little more than the amount of data addressable by the host through the logical address space of the system, a typical case. In this case, data consolidation or collection may be required before a host programming command can be executed. The programming time is then increased as a result.

The sizes of the blocks have been increasing in successive generations of memory systems in order to increase the number of bits of data that may be stored in a given semiconductor area. Blocks storing 256 data sectors and more are becoming common. Additionally, two, four or more blocks of different arrays or sub-arrays are often logically linked together into metablocks in order to increase the degree of parallelism in data programming and reading. Along with such large capacity operating units come challenges in operating them efficiently.

A common host interface for such memory systems is a logical address interface similar to that commonly used with disk drives. Files generated by a host to which the memory is connected are assigned unique addresses within the logical address space of the interface. The memory system then commonly maps data between the logical address space and the physical blocks or metablocks of the memory. The memory system keeps track of how the logical address space is mapped into the physical memory but the host is unaware of this. The host keeps track of the addresses of its data files within the logical address space but the memory system operates without knowledge of this mapping.

SUMMARY

Many techniques have been developed that overcome to various degrees certain of the problems encountered in efficiently operating such large erase block flash memory systems. The present invention, on the other hand, is based upon a fundamental change, namely by changing the data transfer interface between the memory and the host system. Rather than communicating data between them by the use of logical addresses within a virtual address space, a data file is identified by a filename assigned by the host and is accessed by offset address within the file. The memory system then knows the host file to which each sector or other unit of data belongs. The file unit being discussed herein is a set of data that is ordered, such as by having sequential offset addresses, and which is created and uniquely identified by an application program operating in a host computing system.

This is not employed by most current commercial memory systems since hosts now identify data to the memory system within all files by a common set of logical addresses without identifying the files. By identifying host data by file objects instead of using logical addresses, the memory system controller can store the data in a manner that reduces the need for such frequent data consolidation and garbage collection. The frequency of data copy operations and the amount of data copied are thus significantly reduced, thereby increasing the data programming and reading performance of the memory system. Further, the memory system controller maintains directory and index table information of the memory blocks into which host files are stored. It is then unnecessary for the host to maintain the file allocation table (FAT) that is currently necessary for managing a logical address interface.

Rather, data of a file are identified by data groups and the location of the file's data groups within the memory are kept in a file index table (FIT). As described more fully in the patent applications cross-referenced above, particularly Ser. No. 11/060,248, a data group contains data having both contiguous logical offset addresses and contiguous physical memory addresses. As also described in the patent applications cross-referenced above, an index of valid data groups for each file is maintained in the FIT by their offset addresses, which are accessed for a given file through a file directory by use of its unique file identifier. Access of the FIT entries for a file then gives the physical locations of the data groups of the file.

A host with which the memory system may be connected typically operates with a preset maximum number of files opened at one time, such as five such files. In the event that a new file needs to be opened when the maximum number of files are already opened, a currently opened file is first closed by the host. Data groups of an open file are subject to frequent changes as the file is modified by having additional data written to it, some of its data updated or deleted, and the like. Updating the FIT list of data groups for a file typically requires reading a page containing the entries for the file, modifying those entries and then rewriting the modified page into a different location of the memory, typically an erased page within the same memory block if one exists. The file directory therefore needs to be able to point to the current page containing FIT entries for a file as that page changes.

It is preferable to be able to update the list of data groups of an active file without the need to rewrite anything in the file directory. A technique of indirectly addressing the data groups of open files allows the file directory to remain pointing to the same location in memory when accessing the FIT entries for a file. The file directory preferably addresses logical pointers, contained in the last page of FIT entries that has been written, that contain addresses of pages containing updated FIT entries for the files. Although the logical pointers change as FIT entries for a file are updated, the address in the file directory for the file need not change.

However, such indirect addressing is not efficient when a large number of files are stored in the memory system, such as occurs when many small files are being stored, since the directory and FIT pages can contain entries for only so many files at one time, depending of course on their data storage capacity. As a result, for files that are closed by the host, and therefore not currently active, the index entries are preferably directly addressed by the file directory. The logical address pointers characteristic of indirect addressing are not used.

A combination of indirect addressing of FIT entries for files likely to be modified in the near future, such as open files, and direct addressing for closed files is therefore a preferred mode of operation. That is, for an open file to which data are actively being written or updated, the file directory indirectly defines the locations in the FIT of a set of index entries identified by a unique identifier of the file, in a manner that the set of index entries for an active file may be modified without the need to modify the file directory. This may be accomplished, in a specific example, by the file directory addressing a given location in memory that refers it to the actual physical location of the index entries for the file. This reference changes as the index entries are updated and moved but without having to update the file directory. At the same time, for a closed file, the file directory directly defines the locations in the FIT of a set of index entries identified by the unique file identifier. The relocation of index entries for a closed file is much less likely than for an open file.

Further, for use in direct addressing, the index entries in a FIT page are preferably limited to data groups of files whose pointers to the FIT are contained in the same page of the file directory. Only one page of the file directory therefore needs to be updated when one or more FIT entries for a file listed on that directory page are updated. Otherwise, it will often be necessary to update multiple file directory pages when one or more FIT entries of a file are updated.

Other aspects, advantages, features and details of the present invention are included in a description of exemplary examples thereof that follows, which description should be taken in conjunction with the accompanying drawings.

All patents, patent applications, articles, other publications, documents and things referenced herein are hereby incorporated herein by this reference in their entirety for all purposes. To the extent of any inconsistency or conflict in the definition or use of terms between any of the incorporated

BRIEF DESCRIPTION OF THE DRAWINGS

FIGS. 13A-13D show four different examples of writing data of files directly into the memory;

FIGS. 14A-14E illustrate a sequence of writing a single data file directly into the memory;

FIG. 15 shows the result of reclaiming the blocks of FIG. 14E;

FIG. 16 illustrates the reclaiming of a block containing only one data group and obsolete data;

FIG. 17 shows entries of a FIT for the data groups of FIGS. 14A, 14C, 14E, 15 and 16;

FLASH MEMORY SYSTEM GENERAL DESCRIPTION

A common flash memory system and a typical operation with host devices are described with respect to FIGS. 1-8. It is in such a system that the various aspects of the present invention may be implemented. A host system 1 of FIG. 1 stores data into and retrieves data from a flash memory 2. Although the flash memory can be embedded within the host, the memory 2 is illustrated to be in the more popular form of a card that is removably connected to the host through mating parts 3 and 4 of a mechanical and electrical connector. There are currently many different flash memory cards that are commercially available, examples being those sold under trademarks CompactFlash (CF), the MultiMediaCard (MMC), Secure Digital (SD), miniSD, microSD, Memory Stick, SmartMedia and TransFlash. Although these cards have unique mechanical and/or electrical interfaces according to their standardized specifications, the flash memory included in each is very similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged. The memory system usually contains its own memory controller and drivers but there are also some memory only systems that are instead controlled by software executed by the host to which the memory is connected. In some memory systems containing the controller, especially those embedded within a host, the memory, controller and drivers are often formed on a single integrated circuit chip.

Figure 1:
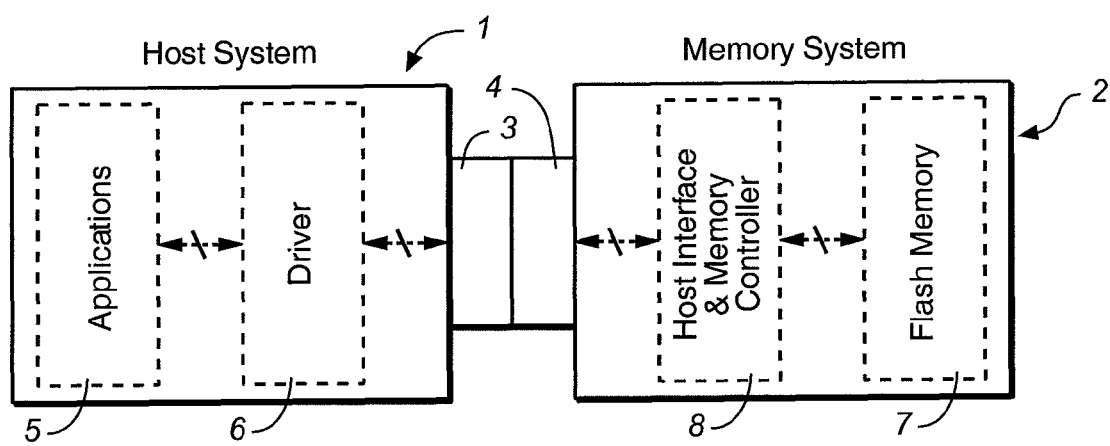
FIG. 1 schematically illustrates a host and a connected non-volatile memory system as currently implemented.

The host system 1 of FIG. 1 may be viewed as having two major parts, insofar as the memory 2 is concerned, made up of a combination of circuitry and software. They are an applications portion 5 and a driver portion 6 that interfaces with the memory 2. In a personal computer, for example, the applications portion 5 can include a processor running word processing, graphics, control or other popular application software. In a camera, cellular telephone or other host system that is primarily dedicated to performing a single set of functions, the applications portion 5 includes the software that operates the camera to take and store pictures, the cellular telephone to make and receive calls, and the like.

The memory system 2 of FIG. 1 includes flash memory 7, and circuits 8 that both interface with the host to which the card is connected for passing data back and forth and control the memory 7. The controller 8 typically converts between logical addresses of data used by the host 1 and physical addresses of the memory 7 during data programming and reading.

Figure 2:
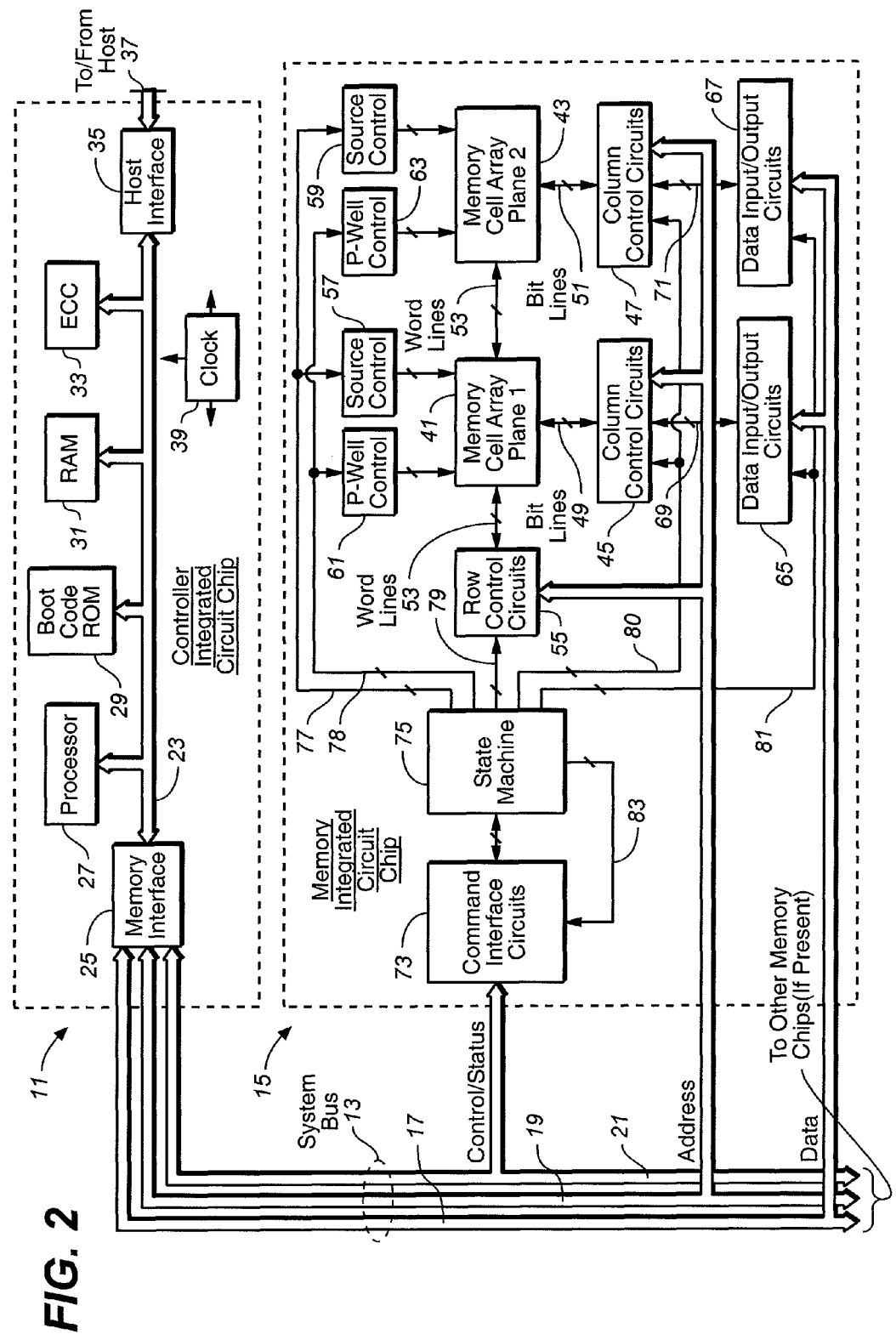
FIG. 2 is a block diagram of an example flash memory system for use as the non-volatile memory of FIG. 1.

Referring to FIG. 2, circuitry of a typical flash memory system that may be used as the non-volatile memory 2 of FIG. 1 is described. The system controller is usually implemented on a single integrated circuit chip 11 that is connected in parallel with one or more integrated circuit memory chips over a system bus 13, a single such memory chip 15 being shown in FIG. 2. The particular bus 13 that is illustrated includes a separate set of conductors 17 to carry data, a set 19 for memory addresses and a set 21 for control and status signals. Alternatively, a single set of conductors may be time shared between these three functions. Further, other configurations of system buses can be employed, such as a ring bus that is described in U.S. patent application Ser. No. 10/915,039, filed Aug. 9, 2004, entitled "Ring Bus Structure and It's Use in Flash Memory Systems," now publication no. 2006/0031593 A1.

A typical controller chip 11 has its own internal bus 23 that interfaces with the system bus 13 through interface circuits 25. The primary functions normally connected to the bus are a processor 27 (such as a microprocessor or micro-controller), a read-only-memory (ROM) 29 containing code to initialize ("boot") the system, read-only-memory (RAM) 31 used primarily to buffer data being transferred between the memory and a host, and circuits 33 that calculate and check an error correction code (ECC) for data passing through the controller between the memory and the host. The controller bus 23 interfaces with a host system through circuits 35, which, in the case of the system of FIG. 2 being contained within a memory card, is done through external contacts 37 of the card that are part of the connector 4. A clock 39 is connected with and utilized by each of the other components of the controller 11.

The memory chip 15, as well as any other connected with the system bus 13, typically contains an array of memory cells organized into multiple sub-arrays or planes, two such planes 41 and 43 being illustrated for simplicity but more, such as four or eight such planes, may instead be used. Alternatively, the memory cell array of the chip 15 may not be divided into planes. When so divided however, each plane has its own column control circuits 45 and 47 that are operable largely independently of each other. The circuits 45 and 47 receive addresses of their respective memory cell array from the address portion 19 of the system bus 13, and decode them to address a specific one or more of respective bit lines 49 and 51. The word lines 53 are addressed through row control circuits 55 in response to addresses received on the address bus 19. Source voltage control circuits 57 and 59 are also connected with the respective planes, as are p-well voltage control circuits 61 and 63. If the memory chip 15 has a single array of memory cells, and if two or more such chips exist in the system, the array of each chip may be operated similarly to a plane or sub-array within the multi-plane chip described above.

Data are transferred into and out of the planes 41 and 43 through respective data input/output circuits 65 and 67 that are connected with the data portion 17 of the system bus 13. The circuits 65 and 67 provide for both programming data into the memory cells and for reading data from the memory cells of their respective planes, through lines 69 and 71 connected to the planes through respective column control circuits 45 and 47.

Although the controller 11 controls the operation of the memory chip 15 to program data, read data, erase and attend to various housekeeping matters, each memory chip also contains some controlling circuitry that executes commands from the controller 11 to perform such functions. Interface circuits 73 are connected to the control and status portion 21 of the system bus 13. Commands from the controller are provided to a state machine 75 that then provides specific control of other circuits in order to execute these commands. Control lines 77-81 connect the state machine 75 with these other circuits as shown in FIG. 2. Status information from the state machine 75 is communicated over lines 83 to the interface 73 for transmission to the controller 11 over the bus portion 21.

A NAND architecture of the memory cell arrays 41 and 43 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

Figure 3:
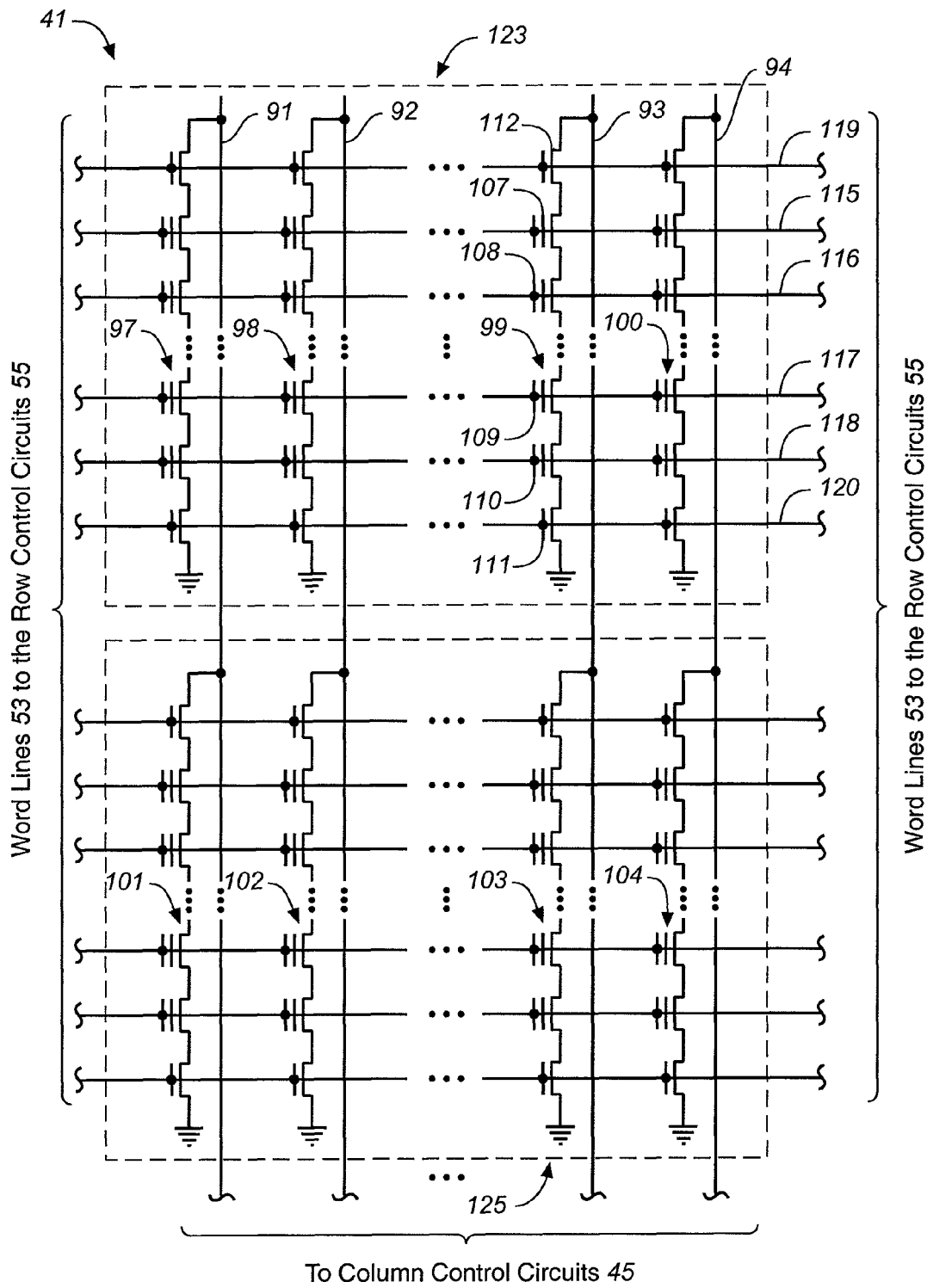
FIG. 3 is a representative circuit diagram of a memory cell array that may be used in the system of FIG. 2.

An example NAND array is illustrated by the circuit diagram of FIG. 3, which is a portion of the memory cell array 41 of the memory system of FIG. 2. A large number of global bit lines are provided, only four such lines 91-94 being shown in FIG. 2 for simplicity of explanation. A number of series connected memory cell strings 97-104 are connected between one of these bit lines and a reference potential. Using the memory cell string 99 as representative, a plurality of charge storage memory cells 107-110 are connected in series with select transistors 111 and 112 at either end of the string. When the select transistors of a string are rendered conductive, the string is connected between its bit line and the reference potential. One memory cell within that string is then programmed or read at a time.

Word lines 115-118 of FIG. 3 individually extend across the charge storage element of one memory cell in each of a number of strings of memory cells, and gates 119 and 120 control the states of the select transistors at each end of the strings. The memory cell strings that share common word and control gate lines 115-120 are made to form a block 123 of memory cells that are erased together. This block of cells contains the minimum number of cells that are physically erasable at one time. One row of memory cells, those along one of the word lines 115-118, are programmed at a time. Typically, the rows of a NAND array are programmed in a prescribed order, in this case beginning with the row along the word line 118 closest to the end of the strings connected to ground or another common potential. The row of memory cells along the word line 117 is programmed next, and so on, throughout the block 123. The row along the word line 115 is programmed last.

A second block 125 is similar, its strings of memory cells being connected to the same global bit lines as the strings in the first block 123 but having a different set of word and control gate lines. The word and control gate lines are driven to their proper operating voltages by the row control circuits 55. If there is more than one plane or sub-array in the system, such as planes 1 and 2 of FIG. 2, one memory architecture uses common word lines extending between them. There can alternatively be more than two planes or sub-arrays that share common word lines. In other memory architectures, the word lines of individual planes or sub-arrays are separately driven.

As described in several of the NAND patents and published application referenced above, the memory system may be operated to store more than two detectable levels of charge in each charge storage element or region, thereby to store more than one bit of data in each. The charge storage elements of the memory cells are most commonly conductive floating gates but may alternatively be non-conductive dielectric charge trapping material, as described in United States patent application publication no. 2003/0109093.

Figure 4:
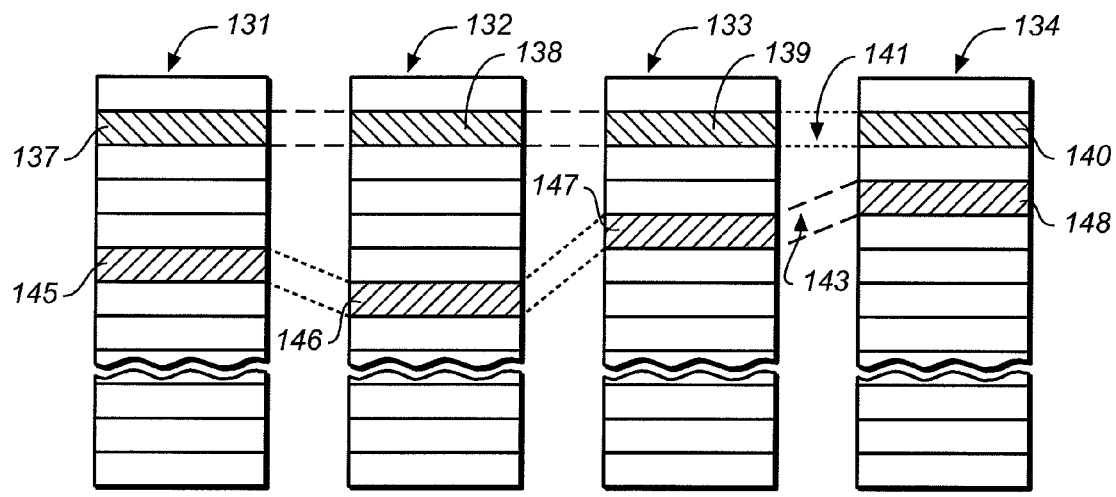
FIG. 4 illustrates an example physical memory organization of the system of FIG. 2.

FIG. 4 conceptually illustrates an organization of the flash memory cell array 7 (FIG. 1) that is used as an example in further descriptions below. Four planes or sub-arrays 131-134 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 4 by rectangles, such as blocks 137, 138, 139 and 140, located in respective planes 131-134. There can be dozens or hundreds of blocks in each plane. As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 137-140 are shown to form one metablock 141. All of the cells within a metablock are typically erased together. The blocks used to form a metablock need not be restricted to the same relative locations within their respective planes, as is shown in a second metablock 143 made up of blocks 145-148. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 5:
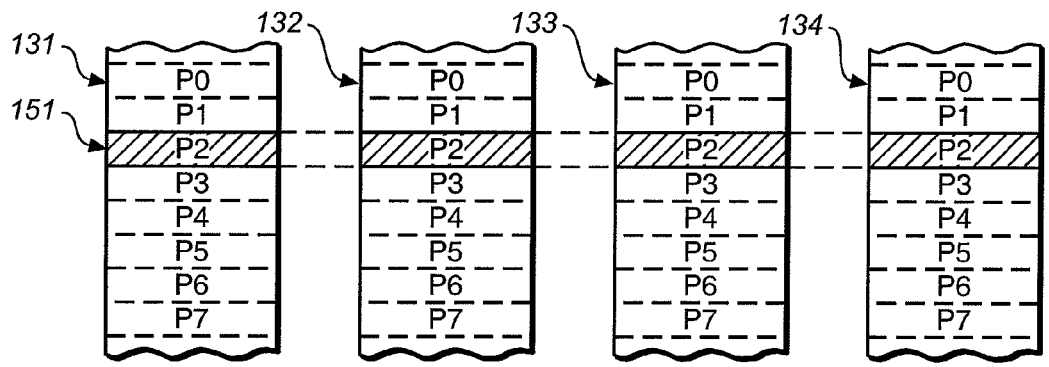
FIG. 5 shows an expanded view of a portion of the physical memory of FIG. 4.

The individual blocks are in turn divided for operational purposes into pages of memory cells, as illustrated in FIG. 5. The memory cells of each of the blocks 131-134, for example, are each divided into eight pages P0-P7. Alternatively, there may be 16, 32 or more pages of memory cells within each block. The page is the unit of data programming and reading within a block, containing the minimum amount of data that are programmed at one time. In the NAND architecture of FIG. 3, a page is formed of memory cells along a word line within a block. However, in order to increase the memory system operational parallelism, such pages within two or more blocks may be logically linked into metapages. A metapage 151 is illustrated in FIG. 5, being formed of one physical page from each of the four blocks 131-134. The metapage 151, for example, includes the page P2 in of each of the four blocks but the pages of a metapage need not necessarily have the same relative position within each of the blocks.

Although it is preferable to program and read the maximum amount of data in parallel across all four planes, for high system performance, the memory system can also be operated to form metapages of any or all of one, two or three pages in separate blocks in different planes. This allows the programming and reading operations to adaptively match the amount of data that may be conveniently handled in parallel and reduces the occasions when part of a metapage remains unprogrammed with data.

A metapage formed of physical pages of multiple planes, as illustrated in FIG. 5, contains memory cells along word line rows of those multiple planes. Rather than programming all of the cells in one word line row at the same time, they are more commonly alternately programmed in two or more interleaved groups, each group storing a page of data (in a single block) or a metapage of data (across multiple blocks). By programming alternate memory cells at one time, a unit of peripheral circuits including data registers and a sense amplifier need not be provided for each bit line but rather are time-shared between adjacent bit lines. This economizes on the amount of substrate space required for the peripheral circuits and allows the memory cells to be packed with an increased density along the rows. Otherwise, it is preferable to simultaneously program every cell along a row in order to maximize the parallelism available from a given memory system.

With reference to FIG. 3, the simultaneous programming of data into every other memory cell along a row is most conveniently accomplished by providing two rows of select transistors (not shown) along at least one end of the NAND strings, instead of the single row that is shown. The select transistors of one row then connect every other string within a block to their respective bit lines in response to one control signal, and the select transistors of the other row connect intervening every other string to their respective bit lines in response to another control signal. Two pages of data are therefore written into each row of memory cells.

Figure 6:
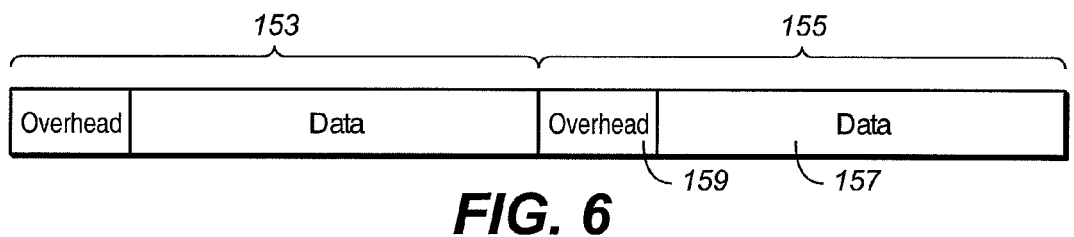
FIG. 6 shows a further expanded view of a portion of the physical memory of FIGS. 4 and 5.

The amount of data in each logical page is typically an integer number of one or more sectors of data, each sector containing 512 bytes of data, by convention. FIG. 6 shows a logical data page of two sectors 153 and 155 of data of a page or metapage. Each sector usually contains a portion 157 of 512 bytes of user or system data being stored and another number of bytes 159 for overhead data related either to the data in the portion 157 or to the physical page or block in which it is stored. The number of bytes of overhead data is typically 16 bytes, making the total 528 bytes for each of the sectors 153 and 155. The overhead portion 159 may contain an ECC calculated from the data portion 157 during programming, its logical address, an experience count of the number of times the block has been erased and re-programmed, one or more control flags, operating voltage levels, and/or the like, plus an ECC calculated from such overhead data 159. Alternatively, the overhead data 159, or a portion of it, may be stored in different pages in other blocks.

As the parallelism of memories increases, data storage capacity of the metablock increases and the size of the data page and metapage also increase as a result. The data page may then contain more than two sectors of data. With two sectors in a data page, and two data pages per metapage, there are four sectors in a metapage. Each metapage thus stores 2048 bytes of data. This is a high degree of parallelism, and can be increased even further as the number of memory cells in the rows are increased. For this reason, the width of flash memories is being extended in order to increase the amount of data in a page and a metapage.

Figure 7:
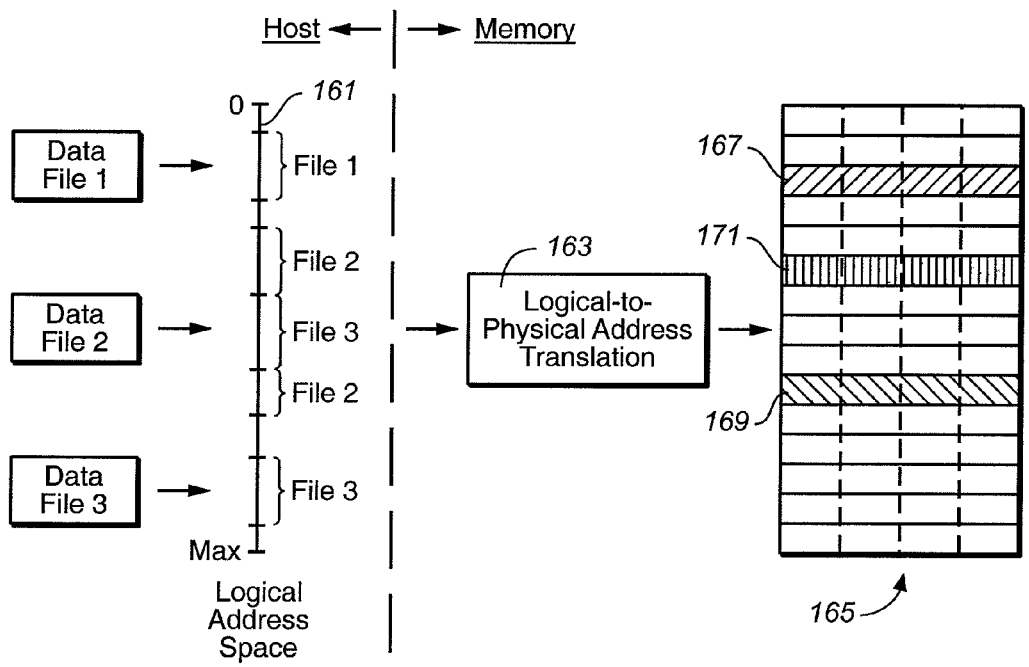
FIG. 7 illustrates a common prior art logical address interface between a host and a re-programmable memory system.

The physically small re-programmable non-volatile memory cards and flash drives identified above are commercially available with data storage capacity of 512 megabytes (MB), 1 gigabyte (GB), 2 GB and 4 GB, and may go higher. FIG. 7 illustrates the most common interface between a host and such a mass memory system. The host deals with data files generated or used by application software or firmware programs executed by the host. A word processing data file is an example, and a drawing file of computer aided design (CAD) software is another, found mainly in general computer hosts such as PCs, laptop computers and the like. A document in the pdf format is also such a file. A still digital video camera generates a data file for each picture that is stored on a memory card. A cellular telephone utilizes data from files on an internal memory card, such as a telephone directory. A PDA stores and uses several different files, such as an address file, a calendar file, and the like. In any such application, the memory card may also contain software that operates the host.

A common logical interface between the host and the memory system is illustrated in FIG. 7. A continuous logical address space 161 is large enough to provide addresses for all the data that may be stored in the memory system. The host address space is typically divided into increments of clusters of data. Each cluster may be designed in a given host system to contain a number of sectors of data, somewhere between 4 and 64 sectors being typical. A standard sector contains 512 bytes of data.

Three Files 1, 2 and 3 are shown in the example of FIG. 7 to have been created. An application program running on the host system creates each file as an ordered set of data and identifies it by a unique name or other reference. Enough available logical address space not already allocated to other files is assigned by the host to File 1. File 1 is shown to have been assigned a contiguous range of available logical addresses. Ranges of addresses are also commonly allocated for specific purposes, such as a particular range for the host operating software, which are then avoided for storing data even if these addresses have not been utilized at the time the host is assigning logical addresses to the data.

When a File 2 is later created by the host, the host similarly assigns two different ranges of contiguous addresses within the logical address space 161, as shown in FIG. 7. A file need not be assigned contiguous logical addresses but rather can be fragments of addresses in between address ranges already allocated to other files. This example then shows that yet another File 3 created by the host is allocated other portions of the host address space not previously allocated to the Files 1 and 2 and other data.

The host keeps track of the memory logical address space by maintaining a file allocation table (FAT), where the logical addresses assigned by the host to the various host files by the conversion 160 are maintained. The FAT table is frequently updated by the host as new files are stored, other files deleted, files modified and the like. The FAT table is typically stored in a host memory, with a copy also stored in the non-volatile memory that is updated from time to time. The copy is typically accessed in the non-volatile memory through the logical address space just like any other data file. When a host file is deleted, the host then deallocates the logical addresses previously allocated to the deleted file by updating the FAT table to show that they are now available for use with other data files.

The host is not concerned about the physical locations where the memory system controller chooses to store the files. The typical host only knows its logical address space and the logical addresses that it has allocated to its various files. The memory system, on the other hand, through a typical host/card interface, only knows the portions of the logical address space to which data have been written but does not know the logical addresses allocated to specific host files, or even the number of host files. The memory system controller converts the logical addresses provided by the host for the storage or retrieval of data into unique physical addresses within the flash memory cell array where host data are stored. A block 163 represents a working table of these logical-to-physical address conversions, which is maintained by the memory system controller.

The memory system controller is programmed to store data files within the blocks and metablocks of a memory array 165 in a manner to maintain the performance of the system at a high level. Four planes or sub-arrays are used in this illustration. Data are preferably programmed and read with the maximum degree of parallelism that the system allows, across an entire metablock formed of a block from each of the planes. At least one metablock 167 is usually allocated as a reserved block for storing operating firmware and data used by the memory controller. Another metablock 169, or multiple metablocks, may be allocated for storage of host operating software, the host FAT table and the like. Most of the physical storage space remains for the storage of data files. The memory controller does not know, however, how the data received has been allocated by the host among its various file objects. All the memory controller typically knows from interacting with the host is that data written by the host to specific logical addresses are stored in corresponding physical addresses as maintained by the controller's logical-to-physical address table 163.

In a typical memory system, a few extra blocks of storage capacity are provided than are necessary to store the amount of data within the address space 161. One or more of these extra blocks may be provided as redundant blocks for substitution for other blocks that may become defective during the lifetime of the memory. The logical grouping of blocks contained within individual metablocks may usually be changed for various reasons, including the substitution of a redundant block for a defective block originally assigned to the metablock. One or more additional blocks, such as metablock 171, are typically maintained in an erased block pool. When the host writes data to the memory system, the controller converts the logical addresses assigned by the host to physical addresses within a metablock in the erased block pool. Other metablocks not being used to store data within the logical address space 161 are then erased and designated as erased pool blocks for use during a subsequent data write operation. In a preferred form, the logical address space is divided into logical groups that each contain an amount of data equal to the storage capacity of a physical memory metablock, thus allowing a one-to-one mapping of the logical groups into the metablocks.

Data stored at specific host logical addresses are frequently overwritten by new data as the original stored data become obsolete. The memory system controller, in response, writes the new data in an erased block and then changes the logical-to-physical address table for those logical addresses to identify the new physical block to which the data at those logical addresses are stored. The blocks containing the original data at those logical addresses are then erased and made available for the storage of new data. Such erasure often must take place before a current data write operation may be completed if there is not enough storage capacity in the pre-erased blocks from the erase block pool at the start of writing. This can adversely impact the system data programming speed. The memory controller typically learns that data at a given logical address has been rendered obsolete by the host only when the host writes new data to their same logical address. Many blocks of the memory can therefore be storing such invalid data for a time.

The sizes of blocks and metablocks are increasing in order to efficiently use the area of the integrated circuit memory chip. This results in a large proportion of individual data writes storing an amount of data that is less than the storage capacity of a metablock, and in many cases even less than that of a block. Since the memory system controller normally directs new data to an erased pool metablock, this can result in portions of metablocks going unfilled. If the new data are updates of some data stored in another metablock, remaining valid metapages of data from that other metablock having logical addresses contiguous with those of the new data metapages are also desirably copied in logical address order into the new metablock. The old metablock may retain other valid data metapages. This results over time in data of certain metapages of an individual metablock being rendered obsolete and invalid, and replaced by new data with the same logical address being written to a different metablock.

In order to maintain enough physical memory space to store data over the entire logical address space 161, such data are periodically compacted or consolidated (garbage collection). It is also desirable to maintain sectors of data within the metablocks in the same order as their logical addresses as much as practical, since this makes reading data in contiguous logical addresses more efficient. So data compaction and garbage collection are typically performed with this additional goal. Some aspects of managing a memory when receiving partial block data updates and the use of metablocks are described in U.S. Pat. No. 6,763,424.

Data compaction typically involves reading all valid data metapages from a metablock and writing them to a new metablock, ignoring metapages with invalid data in the process. The metapages with valid data are also preferably arranged with a physical address order that matches the logical address order of the data stored in them. The number of metapages occupied in the new metablock will be less than those occupied in the old metablock since the metapages containing invalid data are not copied to the new metablock. The old block is then erased and made available to store new data. The additional metapages of capacity gained by the consolidation can then be used to store other data.

During garbage collection, metapages of valid data with contiguous or near contiguous logical addresses are gathered from two or more metablocks and re-written into another metablock, usually one in the erased block pool. When all valid data metapages are copied from the original two or more metablocks, they may be erased for future use.

Data consolidation and garbage collection take time and can affect the performance of the memory system, particularly if data consolidation or garbage collection needs to take place before a command from the host can be executed. Such operations are normally scheduled by the memory system controller to take place in the background as much as possible but the need to perform these operations can cause the controller to have to give the host a busy status signal until such an operation is completed. An example of where execution of a host command can be delayed is where there are not enough pre-erased metablocks in the erased block pool to store all the data that the host wants to write into the memory and data consolidation or garbage collection is needed first to clear one or more metablocks of valid data, which can then be erased. Attention has therefore been directed to managing control of the memory in order to minimize such disruptions. Many such techniques are described in the following U.S. patent applications: Ser. No. 10/749,831, filed Dec. 30, 2003, entitled "Management of Non-Volatile Memory Systems Having Large Erase Blocks," now publication no. 2005/0144358 A1; Ser. No. 10/750,155, filed Dec. 30, 2003, entitled "Non-Volatile Memory and Method with Block Management System,"; Ser. No. 10/917,888, filed Aug. 13, 2004, entitled "Non-Volatile Memory and Method with Memory Planes Alignment," now publication no. 2005/0141313 A1; Ser. No. 10/917,867, filed Aug. 13, 2004, now publication no. 2005/0141312 A1; Ser. No. 10/917,889, filed Aug. 13, 2004, entitled "Non-Volatile Memory and Method with Phased Program Failure Handling," now publication no. 2005/0166087 A1; Ser. No. 10/917,725, filed Aug. 13, 2004, entitled "Non-Volatile Memory and Method with Control Data Management," now publication no. 2005/0144365 A1; Ser. No. 11/192,220, filed Jul. 27, 2005, entitled "Non-Volatile Memory and Method with Multi-Stream Update Tracking"; Ser. No. 11/192,386, filed Jul. 27, 2005, entitled "Non-Volatile Memory and Method with Improved Indexing for Scratch Pad and Update Blocks"; and Ser. No. 11/191,686, filed Jul. 27, 2005, entitled "Non-Volatile Memory and Method with Multi-Stream Updating".

One challenge to efficiently control operation of memory arrays with very large erase blocks is to match and align the number of data sectors being stored during a given write operation with the capacity and boundaries of blocks of memory. One approach is to configure a metablock used to store new data from the host with less than a maximum number of blocks, as necessary to store a quantity of data less than an amount that fills an entire metablock. The use of adaptive metablocks is described in U.S. patent application Ser. No. 10/749,189, filed Dec. 30, 2003, entitled "Adaptive Metablocks," now publication no. 2005/0144357 A1. The fitting of boundaries between blocks of data and physical boundaries between metablocks is described in patent applications Ser. No. 10/841,118, filed May 7, 2004, now publication no. 2005/0144363 A1, and Ser. No. 11/016,271, filed Dec. 16, 2004, now publication no. 2005/0144367 A1, entitled "Data Run Programming."

The memory controller may also use data from the FAT table, which is stored by the host in the non-volatile memory, to more efficiently operate the memory system. One such use is to learn when data has been identified by the host to be obsolete by deallocating their logical addresses. Knowing this allows the memory controller to schedule erasure of the blocks containing such invalid data before it would normally learn of it by the host writing new data to those logical addresses. This is described in U.S. patent application Ser. No. 10/897,049, filed Jul. 21, 2004, entitled "Method and Apparatus for Maintaining Data on Non-Volatile Memory Systems," now publication no. 2006/0020744 A1. Other techniques include monitoring host patterns of writing new data to the memory in order to deduce whether a given write operation is a single file, or, if multiple files, where the boundaries between the files lie. U.S. patent application Ser. No. 11/022,369, filed Dec. 23, 2004, entitled "FAT Analysis for Optimized Sequential Cluster Management," now publication no. 2006/0020745 A1, describes the use of techniques of this type.

To operate the memory system efficiently, it is desirable for the controller to know as much about the logical addresses assigned by the host to data of its individual files as it can. Data files can then be stored by the controller within a single metablock or group of metablocks, rather than being scattered among a larger number of metablocks when file boundaries are not known. The result is that the number and complexity of data consolidation and garbage collection operations are reduced. The performance of the memory system improves as a result. But it is difficult for the memory controller to know much about the host data file structure when the host/memory interface includes the logical address space 161 (FIG. 7), as described above.

Figures 8, 10:
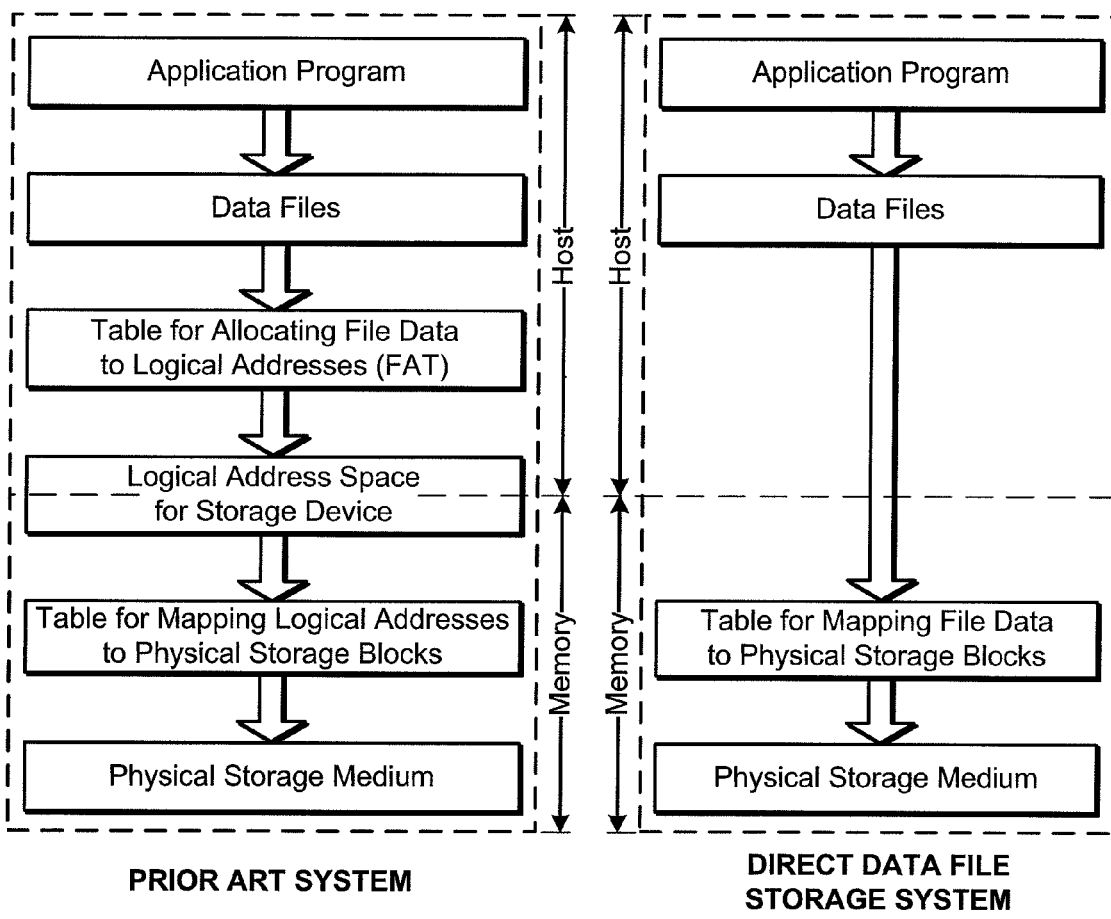
FIG. 8 illustrates in a different manner than FIG. 7 a common prior art logical address interface between a host and a re-programmable memory system.
FIG. 10 illustrates in a different manner than FIG. 9 a direct file storage interface between a host and a re-programmable memory system, according to the present invention.

Referring to FIG. 8, the typical logical address host/memory interface as already shown in FIG. 7 is illustrated differently. The host generated data files are allocated logical addresses by the host. The memory system then sees these logical addresses and maps them into physical addresses of blocks of memory cells where the data are actually stored.

File-Based Memory Interface and Operation

A different type of interface between a host and memory system for the storage of mass amounts of data eliminates use of the logical address space. The host instead logically addresses each file by a unique fileID (or other unique reference) and offset addresses of units of data (such as bytes) within the file. This file address is given directly to the memory system controller, which then keeps its own table of where the data of each host file are physically stored. This new interface can be implemented with the same memory system as described above with respect to FIGS. 2-6. The primary difference with what is described above is the manner in which that memory system communicates with a host system.

Figure 9:
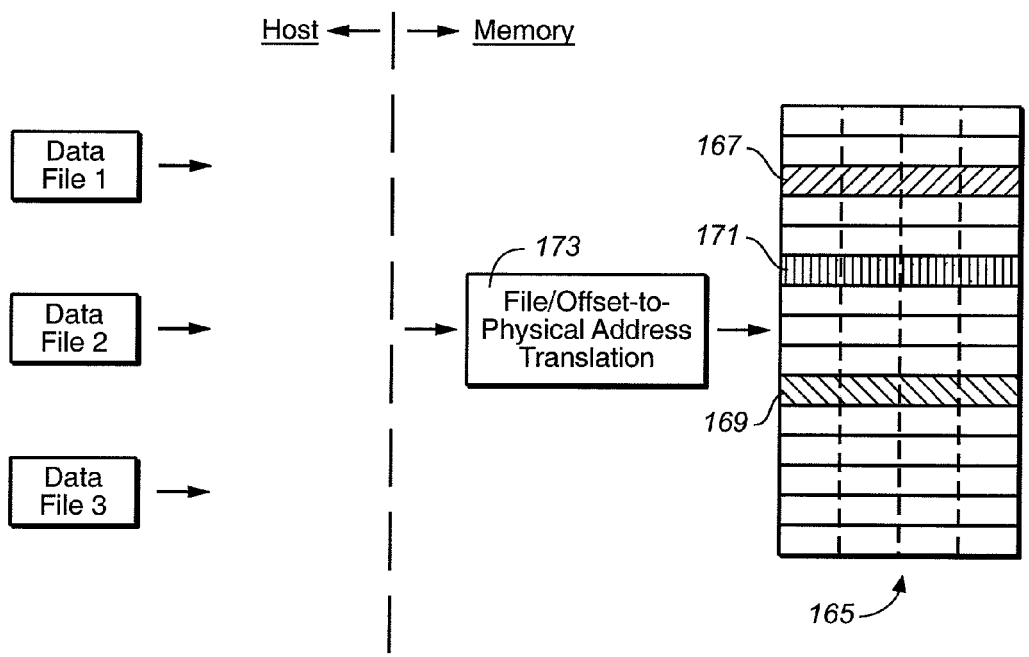
FIG. 9 illustrates a direct file storage interface between a host and a re-programmable memory system, according to the present invention.

This file-based interface is illustrated in FIG. 9, which should be compared with the logical address interface of FIG. 7. An identification of each of the Files 1, 2 and 3 and offsets of data within the files of FIG. 9 are passed directly to the memory controller. This logical address information is then translated by a memory controller function 173 into physical addresses of metablocks and metapages of the memory 165. A file directory keeps track of the host file to which each stored sector, page or other unit of file data belongs.

The file-based interface is also illustrated by FIG. 10, which should be compared with the logical address interface of FIG. 8. The logical address space and host maintained FAT table of FIG. 8 are not present in FIG. 10. Rather, data files generated by the host are identified to the memory system by file number and offsets of data within the file. The memory system controller then directly maps the files to the physical blocks of the memory cell array and maintains file directory and index table information of memory blocks into which host files are stored. It is then unnecessary for the host to maintain the file allocation table (FAT) that is currently necessary for managing a logical address interface.

Figure 11:
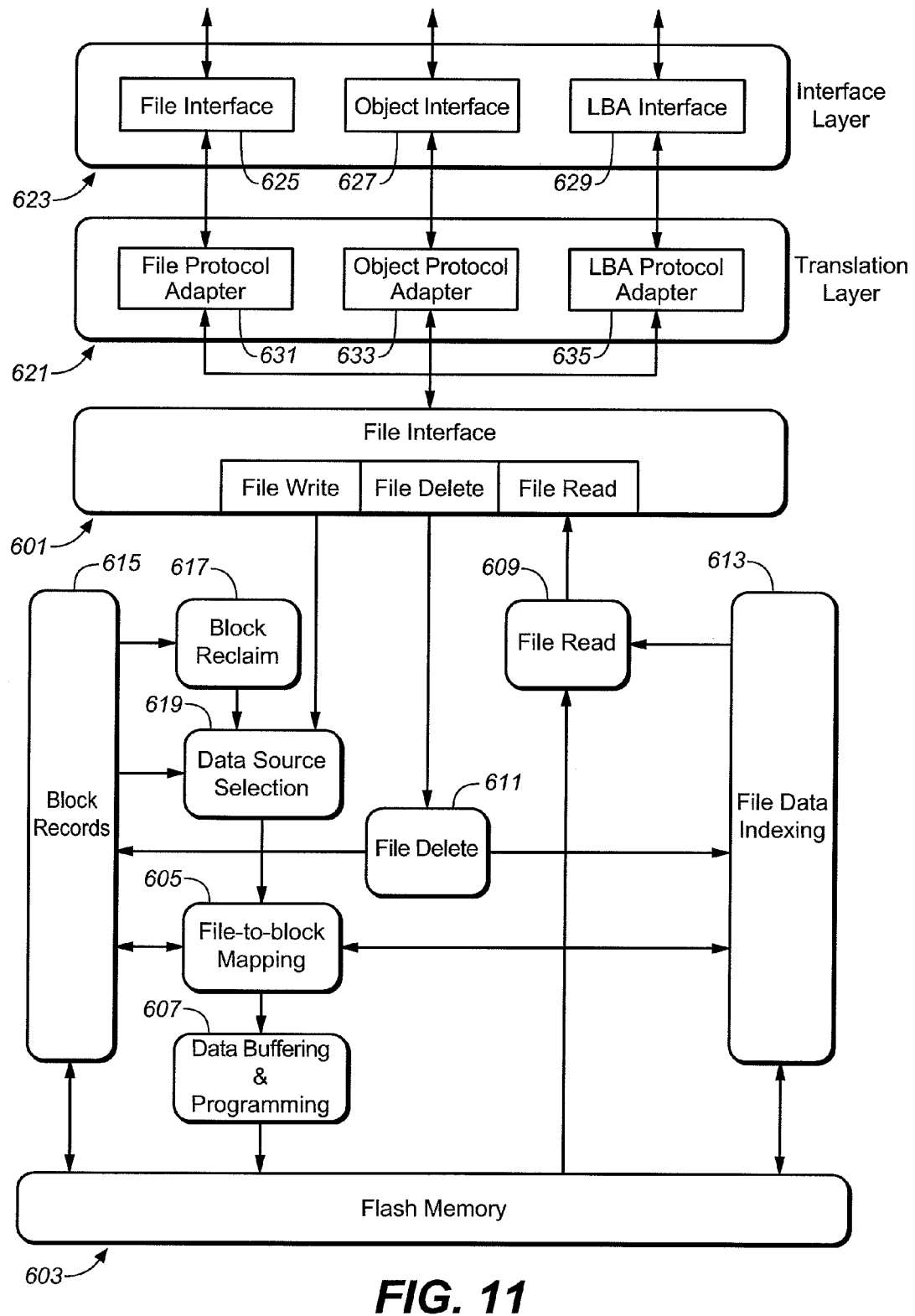
FIG. 11 is a functional block diagram of a memory system operating with a direct data file storage interface.

FIG. 11 is a general block diagram of the major functions of a direct data file system that are carried out by the memory system firmware executed by its processor and by other circuits of the controller. It provides an overall framework in which the specific memory operations described hereinafter may be considered. A file-based interface 601 layer passes commands and data between the memory system and an external host system or a host application being executed on the same memory card or flash drive, for the three main functions of the memory system, namely writing files, deleting files and reading files. Data are stored in a flash memory array 603.

A file-to-block mapping function 605 organizes storage of data in flash memory according to the files by which the data is identified. For each file, the number of flash blocks containing data for the file together with data for other files is restricted. This minimizes the volume of unrelated file data that must be relocated to reclaim obsolete data space that is created when a file is deleted or modified, resulting in improved performance and memory endurance. The physical block of memory cells of the memory 603 is the basic unit of data management.

A data buffering and programming function 607 controls the temporary storage in a buffer memory of file data from either the file interface or a location in flash memory, its transfer to flash memory and its programming in either the active block for the file or a temporary swap block. The start of each file data group is preferably aligned directly with the start of a metapage in flash memory. Logical metapage structures are defined within the offset address space for each data group.

A function 609 of FIG. 11 controls access to the memory 603 for reading data stored therein. The deletion of data of a file, when commanded by the host, causes a function 611 to update file indexing information maintained by a function 613 and records of blocks in a function 615.

The file data indexing 613 indexes the individual files stored in the memory 603 by a unique file identifier and offset addresses of data within the file. The data for each file are stored as a set of data groups having contiguous logical offset addresses. A file directory identifies the locations in a file index table (FIT) of sets of data group entries for the individual files. The identity of blocks that are erased, either partially programmed with file data or that contain file data together with obsolete data are maintained by the block records function 615.

The primary purpose of the garbage collection and data consolidation functions described above are to reclaim unused memory space for use to store additional data. In garbage collection, valid data of a source block are copied from blocks also containing obsolete data into one or more destination blocks that have at least some erased space. This gathers valid data into a fewer number of blocks, thus freeing up capacity occupied by obsolete data once the original source block(s) are erased. In data consolidation, valid data of one partially filled block, which thus also contains erased but unused space, are combined with valid data of another partially filled block. Partially filled blocks result most commonly from writing a new file that is closed with its last erased block only partially filled. Once data are consolidated, the source blocks containing the data just copied, which are then duplicate data, are then erased and made available for the storage of new data.

Both of the garbage collection and data consolidation operations are handled herein together as block reclamation. A function 617 reclaims blocks by controlling the copying of valid file data from a physical block having unprogrammed metapages, or containing obsolete data, to other blocks. This allows the original block to be erased to reclaim the unused space it contained and make this space available for the storage of new file data. A function 619 adaptively controls the occurrence and duration of block reclaim operations, according to the amount of reclaimable capacity and number of erased blocks. Block reclaim is performed at an optimum rate relative to the rate of writing new file data in a manner that maintains good overall performance of the memory system.

In the functional diagram of FIG. 11, a translation layer 621 and interface layer 623 are above the file interface 601, which interfaces with the backend system of the flash memory and controls its operation. In this example, the interface layer 623 has the capability of communicating data outside of the memory system with a host or otherwise, according one of three different protocols. A file interface 625 is that being primarily described herein, wherein data of individual files are identified by a unique file identifier and logical offset addresses within the file. An object interface 627 has a primary use to transfer data files between electronic devices, where the sizes of the files are usually known. Existing protocols for the interface 627 include the Media Transfer Protocol (MTP) and the Picture Transfer Protocol (PTP) from Microsoft Corporation. A backward compatible logical (LBA) interface 629 is also included in this example. Data are transferred through the interface 629 with the protocol currently used by flash memory cards, similar to that of magnetic disk drive systems, where the host addresses data to a defined logical address space of the memory system.

The translation layer 621 includes protocol adaptors 631, 633 and 635 that function to convert the protocols of respective interface protocols 625, 627 and 629 into a common protocol for the file interface 601. Commands, data formats and the like are converted between different protocols by the translation layer. The LBA protocol adaptor 635 additionally divides the logical address space of the memory system into static files. These files are then handled by the file interface 601 in the same manner as distinct files communicated through the interfaces 625 and 627. Details of the function of the LBA protocol adaptor 635 may be had by reference to U.S. patent application Ser. No. 11/196,869, filed Aug. 3, 2005, naming S. A. Gorobets as inventor. More information of the translation and interface layers 621 and 623 is given in U.S. patent application Ser. No. 11/316,577, filed Dec. 21, 2005, naming Alan Sinclair as inventor.

When a new data file is programmed into the memory, the data are written into an erased block of memory cells beginning with the first physical location in the block and proceeding through the locations of the block sequentially in order.

The data are programmed in the order received from the host, regardless of the order of the offsets of that data within the file. Programming continues until all data of the file have been written into the memory. If the amount of data in the file exceeds the capacity of a single memory block, then, when the first block is full, programming continues in a second erased block. The second memory block is programmed in the same manner as the first, in order from the first location until either all the data of the file are stored or the second block is full. A third or additional blocks may be programmed with any remaining data of the file. Multiple blocks or metablocks storing data of a single file need not be physically or logically contiguous. For ease of explanation, unless otherwise specified, it is intended that the term "block" as used herein refer to either the block unit of erase or a multiple block "metablock," depending upon whether metablocks are being used in a specific system.

Figure 12:
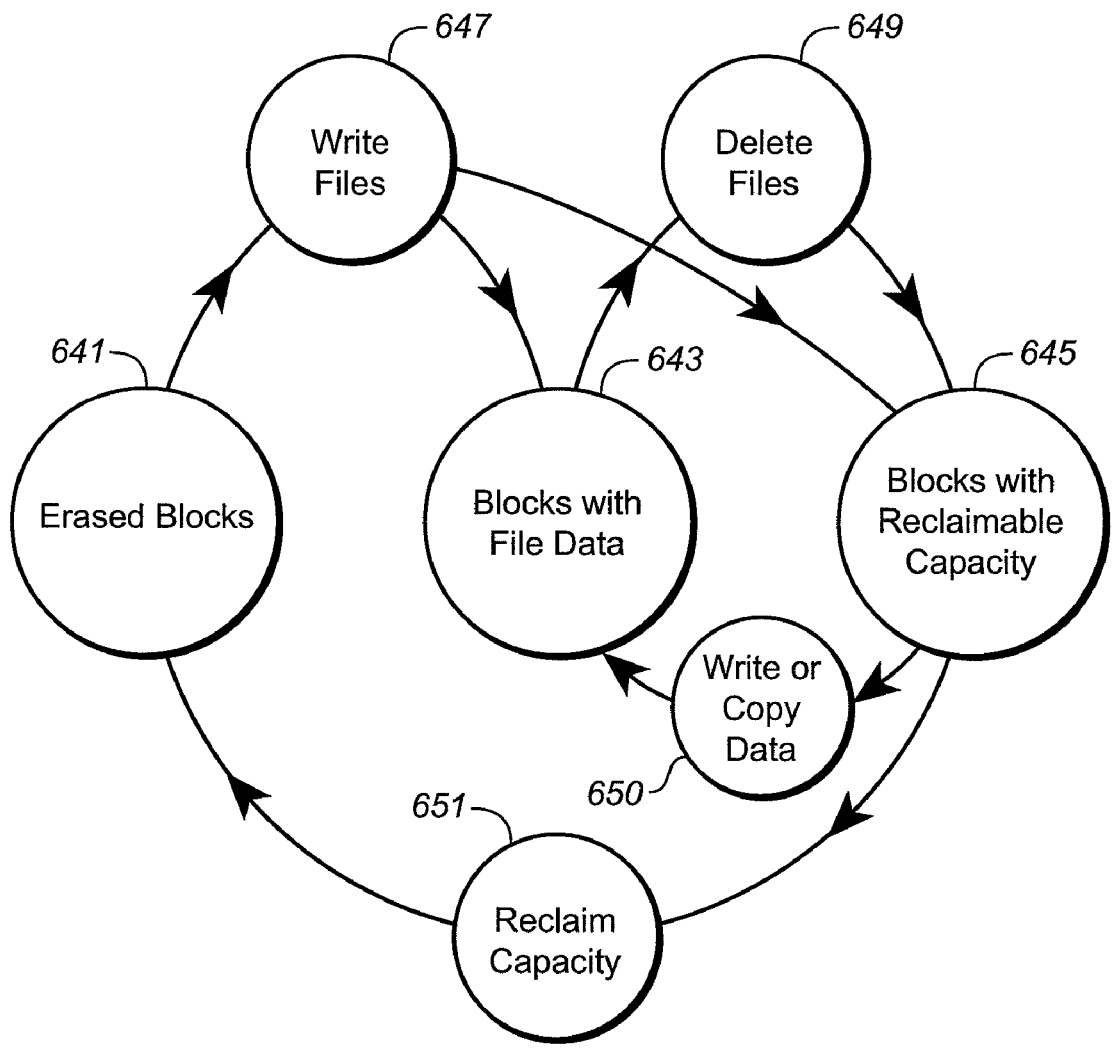
FIG. 12 illustrates an operating cycle of a direct data file memory.

The diagram of FIG. 12 illustrates overall functioning of the memory operations shown in FIG. 11. Individual memory blocks may be viewed to be in one of three states. These are erased blocks 641, blocks 643 that are storing valid file data without reclaimable capacity and blocks 645 that may contain some valid file data but which also have reclaimable capacity from unprogrammed erased pages and/or obsolete (invalid) data stored in them. Data are written to erased memory blocks by a function 647, thereby to result in blocks in category 643 or 645, depending upon whether the resulting programmed blocks retain any reclaimable capacity. When files are deleted, as indicated by a function 649, blocks 643 containing data of the file are converted to blocks 645 with reclaimable capacity. Unused storage capacity of the blocks 645 is reclaimed by a function 651, after copying data in a function 650 from reclaimable blocks to other blocks, that results in returning those blocks to the status of erased blocks 641 to which new data may be written.

Referring to FIG. 13A, the writing of a data file to the memory system is illustrated. A data file 181, in this example, is larger than the storage capacity of one block or metablock 183 of the memory system, which is shown to extend between solid vertical lines. A portion 184 of the data file 181 is therefore also written into a second block 185. These memory cell blocks are shown to be physically contiguous but they need not be. Data from the file 181 are written as they are received streaming from the host until all the data of the file have been written into the memory. In the example of FIG. 13A, the data 181 are the initial data for file.

A preferred way for the memory system to manage and keep track of the stored data is with the use of variable sized data groups. That is, data of a file are stored as a plurality of groups of data that may be chained together in a defined order to form the complete file. Preferably, however, the order of the data groups within the file is maintained by the memory system controller through use of the file index table (FIT). As a stream of data from the host are being written, a new data group is begun whenever there is a discontinuity either in the logical offset addresses of the file data or in the physical space in which the data are being stored. An example of such a physical discontinuity is when data of a file fills one block and begins to be written into another block. This is illustrated in FIG. 13A, wherein a first data group fills the first block 183 the remaining portion 184 of the file is stored in the second block 185 as a second data group. The first data group can be represented by (F0,D0), where F0 is the logical offset of the beginning of the data file and D0 is the physical location within memory where the file begins. The second data group is represented as (F1,D1), where F1 is the logical file offset of data that is stored at the beginning of the second block 185 and D1 is the physical location where that data are stored.

The amount of data being transferred through the host-memory interface may be expressed in terms of a number of bytes of data, a number of sectors of data, or with some other granularity. A host most often defines data of its files with byte granularity but then groups bytes into sectors of 512 bytes each, or into clusters of multiple sectors each, when communicating with a large capacity memory system through a current logical address interface. This is usually done to simplify operation of the memory system. Although the file-based host-memory interface being described herein may use some other unit of data, the original host file byte granularity is generally preferred. That is, data offsets, lengths, and the like, are preferably expressed in terms of byte(s), the smallest reasonable unit of data, rather than by sector(s), cluster(s) or the like. This allows more efficient use of the capacity of the flash memory storage with the techniques described herein.

The new file written into the memory in the-manner illustrated in FIG. 13A is then represented in a FIT as a sequence of index entries (F0,D0), (F1,D1) for the data groups, in that order. That is, whenever the host system wants to access a particular file, the host sends its fileID or other identification to the memory system, which then accesses its FIT to identify the data groups that make up that file. The length <length> of the individual data groups may also be included in their individual entries, for convenience of operation of the memory system. When used, the memory controller calculates and stores the lengths of the data groups.

So long as the host maintains the file of FIG. 13A in an opened state, a physical write pointer P is also preferably maintained to define the location for writing any further data received from the host for that file. Any new data for the file are written at the end of the file in the physical memory regardless of the logical position of the new data within the file. The memory system allows multiple files to remain open at one time, such as 4 or 5 such files, and maintains a write pointer P for each of them. The write pointers for different files point to locations in different memory blocks. If the host system wants to open a new file when the memory system limit of a number of open files already exists, one of the opened files is first closed and the new file is then opened.

FIG. 13B illustrates the appending of data by the host to the end of the previously written but still open file of FIG. 13A. Data 187 are shown to be added by the host system to the end of the file, which are also written in the second block 185 at the end of the data for that file. The appended data becomes part of the data group (F1,D1), which therefore now contains more data, since there is neither a logical nor a physical address discontinuity between the existing data group 184 and the appended data 189. The full file is thus still represented as a sequence of index entries (F0,D0), (F1,D1) in the FIT. The address of the pointer P is also changed to that of the end of the stored appended data.

An example of the insertion of a block of data 191 into the previously written file of FIG. 13A is shown in FIG. 13C. Although the host is inserting the data 191 into the file, the memory system appends the inserted data at a location 193 at the end of the file data previously written. It is not necessary to rewrite the data of the file in their logical order when data are being inserted into an open file, although this may be done later in the background after the host closes the file. Since the inserted data is stored entirely within the second memory block 185, if forms a single new group (F1,D3). But the making of this insert results in the previous data group (F0, D0) of FIG. 13A being divided into two groups, one (F0,D0) before the insert and one (F2,D1) after the insert. This is because a new data group needs to be formed whenever there is a logical discontinuity of the data, such as occurs at the beginning F1 of the insert and at the end F2 of the insert. The group (F3,D2) is the result of physical address D2 being the beginning of the second block 185. The groups (F1,D3) and (F3,D2) are maintained separate, even though they are stored in the same memory block, because there is a discontinuity in the offsets of the data stored in them. The original file with the insert is then represented in the memory system FIT by data group index entries (F0,D0), (F1,D3), (F2,D1), (F3,D2), in that order. It should be noted from the examples of FIGS. 13A, 13B and 13C, that new data for a new or existing file may be written without making obsolete any data in the memory.

As an alternative to the insertion of data into an existing file that is illustrated in FIG. 13C, the file may be rewritten into the memory as a separate file by the host whenever data have been inserted. This separate file may then be treated by the memory system as a new file. The old file is then deleted by the host, and the memory system may respond by reclaiming the space in which the old file is stored, the data of which are now obsolete.

FIG. 13D illustrates another example, wherein a certain portion of the data originally written in the manner shown in FIG. 13A is updated. A portion 195 of the data file is shown to be updated. Rather than rewriting the entire file in the memory system with the update, an updated portion 197 of the file is appended to the data previously written. A portion 199 of the data previously written is now obsolete. After updating, the file is represented in the memory system FIT by data groups index entries (F0,D0), (F1,D3), (F2,D1), (F3,D2), in that order. The single data group (F0,D0) of FIG. 13A is again divided into pieces in FIG. 13D, one before the updated portion, the updated portion and one after the updated portion. It is desirable to reclaim the space 199 occupied by obsolete data but this is preferably done later, not as part of writing the file data in the memory. Such reclamation will typically result in a fewer number of data groups of data for a particular file being stored.

To further illustrate the use of variable length data groups, a sequence of several write operations involving the same file is shown by FIGS. 14A-14E in order. The original file data W1 is first written into two blocks of the memory system, as shown in FIG. 14A. The file is then defined by two data groups, the first group starting at the beginning of a physical memory block and the second group being required after a physical memory block boundary. The file of FIG. 14A is then described by the following sequence of index entries for the data groups: (F0,D0), (F1,D1).

In FIG. 14B, the host causes the file data written in FIG. 14A to be updated. Updated file data U1 are written immediately following the previous group (F1,D1), with the previous version of the updated data becoming obsolete. Previous group (F0,D0) of FIG. 14A is shortened to a revised group (F0,D0) of FIG. 14B, and previous group (F1,D1) is shortened to group (F4,D2). The updated data are written in two groups (F2,D3) and (F3,D4) because they overlap a boundary of memory blocks. Some of the data are stored in a third memory block. The file is now described by the following sequence of index entries for the data groups: (F0,D0), (F2, D3), (F3,D4), (F4,D2).

The file of FIG. 14B is further modified in FIG. 14C by the host causing insertion of new file data I1. The new data I1 is written into the memory immediately following the previous group (F4,D2) of FIG. 14B, as new groups (F5,D6) and (F6,D7) of FIG. 14C because the inserted data overlap a boundary of memory blocks. A fourth memory block is used. Previous group (F0,D0) of FIG. 14B is split into shortened groups (F0,D0) and (F7,D5) in FIG. 14C, because of the insertion of the new data I1. The file is now described by the following sequence of index entries for the data groups: (F0, D0), (F5,D6), (F6,D7), (F7,D5), (F8,D3), (F9,D4), (F10,D2).

FIG. 14D shows the further modification of the data file of FIG. 14C that appends new data W2 to the end of the file. New data W2 are written immediately following the previous group (F10,D2) of FIG. 14C, as new group (F11,D8) of FIG. 14D. The file is now described by the following sequence of index entries for the data groups: (F0,D0), (F5,D6), (F6,D7), (F7,D5), (F8,D3), (F9,D4), (F10,D2), (F11,D8).

A second update to the open file is shown in FIG. 14E, where updated file data U2 are written to the file of FIG. 14D. The updated data U2 are written in FIG. 14E immediately following the previous group (F11,D8) of FIG. 14D, with the previous version of that data becoming obsolete. Previous group (F9,D4) of FIG. 14D is shortened to a revised group (F9,D4) in FIG. 14E, previous group (F10,D2) becomes fully obsolete, and previous group (F11,D8) is shortened to form a new group (F14,D9). The updated data are written in new groups (F12,D10) and (F13,D11) of FIG. 14E, overlapping a block boundary. A fifth block is now needed to store the file. The file is now described by the following sequence of index entries for the data groups: (F0,D0), (F5,D6), (F6,D7), (F7, D5), (F8,D3), (F9,D4), (F12,D10), (F13,D11), (F14,D9).

The offsets of the data of each file are preferably maintained continuous in the correct logical order after the file's creation or modification according to the preceding description. Therefore, as part of an operation to insert data into a file, for example, offsets of the inserted data provided by the host are continuous from the offset immediately preceding the insert and data already in the file after the insert are incremented by an amount of the inserted data. Updating an existing file most commonly results in data within a given address range of an existing file being replaced by a like amount of updated data, so the offsets of other data of the file usually need not be replaced.

It will be noted that all of the data allocation and indexing functions described above with respect to FIGS. 13 and 14 are performed by the controller of the memory system. Along with an appropriate command, the host merely communicates the fileID and offsets of data within the file that are being sent to the memory system. The memory system does the rest.

An advantage of directly writing file data from the host into the flash memory in the manner just described is that the granularity or resolution of the data so stored may be maintained the same as that of the host. If a host application writes file data with a one-byte granularity, for example, that data may be also be written into the flash memory with a one-byte granularity. The amount and location of data within an individual data group is then measured in a number of bytes. That is, the same offset unit of data that is separately addressable within the host application file is also separately addressable within that file when stored in the flash memory. Any boundaries between data groups of the same file within a block are then specified in the index table to the nearest byte or other host offset unit. Similarly, boundaries between data groups of different files within a block are defined in the unit of the host offset.

The term "sector" is used herein with large block memories to denote the unit of stored data with which an ECC is associated. The sector is therefore the minimum unit of data transfer to and from flash memory when such an error correcting code is generated by the controller of the memory system and stored with the data. A "page" is used to denote a unit of memory cells within a block and is the minimum unit of programming. The term "metapage" is used to denote a page with the full parallelism of a metablock. The metapage is the maximum unit of programming.

It will be noted from FIGS. 14B and 14E that the Update command results in the physical space necessary to store the file being greater than the amount of data in the file. This is because data that have been replaced by the updates remain stored in the memory. It is therefore highly desirable to consolidate (garbage collect) the data of the file into less physical storage space by eliminating the obsolete, invalid data. More storage space therefore becomes available for other data.

It may also be noted that in addition to the file data updates of FIGS. 14B and 14E, the data insert of FIG. 14C results in the file data being stored out of order. That is, updates and inserts are added to the end of the file stored in memory at the time they are made, while they are nearly always logically positioned somewhere within the file. This is the case of the examples of FIGS. 14B, 14C and 14E. It can therefore be desirable to reorder the data of the file stored in the memory to match the order of the offsets within the file. This then improves the speed of reading the stored data since reading the pages and blocks in sequence will give the data of the file in their offset order. This also provides the maximum possible defragmentaion of the file. But reordering the file data to make reading more efficient is not as important to the performance of the memory system as is file data consolidation, which potentially frees up one or more memory blocks for use to store other data. Reordering of the data in a file will therefore usually not be done by itself, where the benefit is not worth the added operating overhead, but can be done as part of many garbage collection operations with little or no added operating overhead.

The file of FIG. 14E includes obsolete data groups (gray portions) stored in the memory because of the two data updates U1 and U2 having been made. The amount of memory capacity being used to store the file is, as a result, substantially greater than the size of the file, as is apparent from FIG. 14E. Garbage collection is therefore appropriate. FIG. 15 provides an illustration of the result of garbage collecting the data file of FIG. 14E. That file, before garbage collection, takes up nearly five blocks of storage capacity (FIG. 14E), while the same file after garbage collection fits within slightly more than three memory cell blocks (FIG. 15). As part of the garbage collection operation, data are copied from the blocks where they are initially written into other erased blocks, and the original blocks then erased. If an entire file is garbage collected, its data may be copied into the new blocks with a physical order that is the same as the data logical offset order within the file. The updates U1 and U2, and the insert I1, for example, are stored after garbage collection (FIG. 15) in the same order as they appear in the host file.

Garbage collection on a file basis also normally results in the formation of new and different data groups within the file being consolidated. In the case of FIG. 15, the file is described by the following new sequence of index entries for the new data groups: (F0,D12), (F1,D13), (F2,D14), (F3,D15). This is a far fewer number of data groups than exist with the state of the file shown in FIG. 14E. There is now one data group for each of the memory cell blocks into which data of the file have been copied. As part of the garbage collection operation, the file index table (FIT) is updated to reflect the new data groups forming the file.

It will be noted that moving from the data distribution of FIG. 14E to that of FIG. 15 involves a substantial amount of data copying. The valid data are read from each of the blocks in FIG. 14E and then written into four erased blocks of FIG. 15. Although this greatly simplifies the data groups of a file for future use, it takes a significant amount of time to copy the data. Therefore, rather than garbage collecting the data on a file basis, an alternative is to do so on a block basis, even when the data is being stored directly in the memory as a file. Unused capacity of blocks may be reclaimed by performing garbage collection on those blocks having the least amount of data to copy to another block. This is described in the patent application referenced above that is entitled "Reclaiming Data Storage Capacity in Flash Memories," application Ser. No. 11/382,232, filed May 8, 2006.

Therefore, reclaiming the blocks holding data of the file when in the state of FIG. 14E operates individually on blocks instead of on multiple blocks storing data of the same file. For example, if the second block 002 of FIG. 14E contained the least amount of valid data of any block of the memory system being considered for a reclaim operation at a given time, its single data group would then be copied from into another, erased block 010, as shown in FIG. 16. The new block then contains a single data group (F8,D16) and the remainder of the block is erased capacity, into which new data may be written. That erased capacity has been reclaimed from the block in which that data was stored in FIG. 14E. The file is then described by the following sequence of index entries for the data groups making up the file: (F0,D0), (F5,D6), (F6, D7), (F7,D5), (F8,D16), (F9,D4), (F12,D10), (F13,D11), (F14,D9). The other blocks shown in FIG. 14E remain unchanged until they individually meet the criteria for a reclaim operation, according to the block reclaim process.

File Data Indexing

FIG. 17 illustrates a sequence of index entries in a file index table (FIT) for one file at each of several different times 0, 2, 4, X and Y. These are the sequences described above with respect to FIGS. 14A, 14C, 14E, 15 and 16, respectively. Data in the FIT are preferably written and kept current by the memory controller without assistance from the host system. The host system supplies the pathnames, the filenames and the offsets of data within the file when writing the data to the memory system but the host does not participate in defining the data groups or where they are stored in the memory cell array. In the entries of FIG. 17, the memory cell blocks of FIGS. 14A-14E are numbered from the left beginning with 1. So for the file in the state illustrated in FIG. 14C, for example, its third data group (F6,D7) is noted in FIG. 17 to be stored in block 004, the fourth block from the left, D7 bytes from that block's initial address. The length of each data group is also preferably included with each entry of the table.

The sequence index entries shown in FIG. 17 for one file are rewritten by the memory controller when a change to the file results in a modification to the data groups of the file, or at other less frequent intervals. The controller can store such changes in its memory, and then write many of them to the flash memory at one time. Only one valid set of indices exists for a file at any one time; five such sets of indices being shown in FIG. 17 that define the file at different times. The indices at times X and Y show the results of two different types of reclaim operations, the first on a file basis and the other on a block basis, as described above. The memory system controller uses the current set of indices of the file as necessary to program additional data to the file, read data from the file, garbage collect data of the file or blocks in which its data are stored, and potentially for other operations. The FIT is therefore easier to use if the individual file index entries are stored in order of their file offsets (Fx) but, if not, the controller can certainly read the entries in that logical order. The most common cause of the memory controller reading the index entries for a particular file is in the course of executing a host command.

First Specific File Indexing Embodiment

Figure 18:
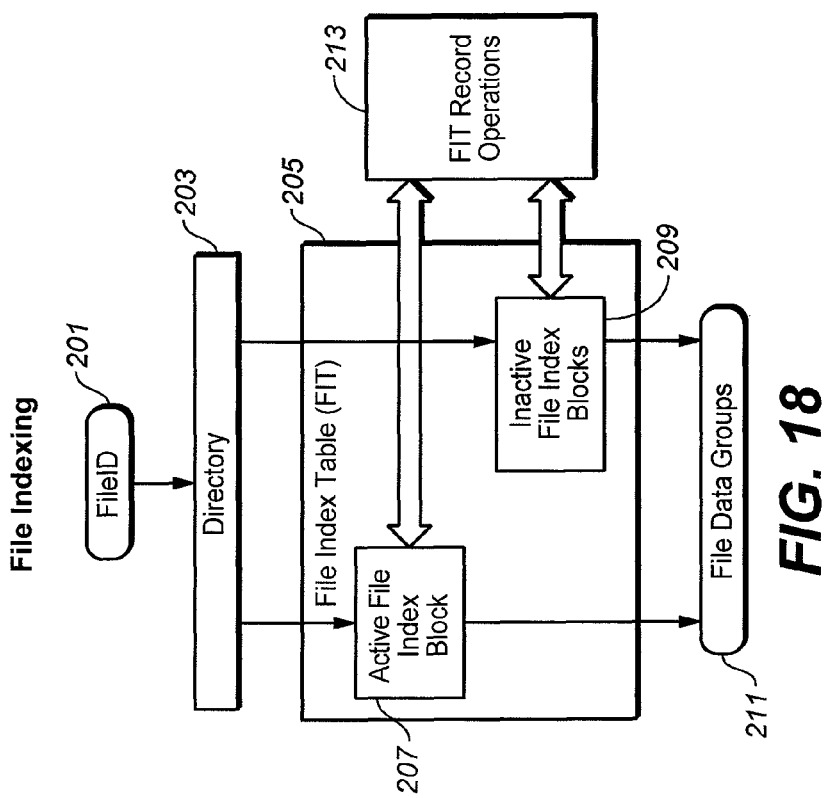
FIG. 18 illustrates the principles of file indexing that uses different FIT structures for active and inactive files, of a first specific file indexing embodiment.

Referring to FIG. 18, files stored in a memory system operating with a direct data file interface are identified by a unique fileID 201, which is a numerical value in a contiguous set. A directory 203 contains an entry for every valid file stored in the memory device. The directory 203 preferably has a flat hierarchy, and does not support subdirectories. This allows the direct data file system in the memory to be independent of the operating system being used within a host. A hierarchical directory conforming to a specific host operating system protocol may be supported by a layer of firmware outside the direct data file system, making use of the flat directory structure in conjunction with the file metadata (also known as file "attribute" information) facility also supported.

Summarizing what has previously been described, data for a file are stored as a set of data groups, each spanning a run of contiguous addresses in both file offset address space and physical address space. Data groups within the set for a file need not have any specific physical address relationship with each other. A data group is a set of file data with contiguous offset addresses for a file, programmed at contiguous physical addresses in a single memory block. A file will normally be programmed as a number of data groups. A data group may have any length between one byte and one block. A file index table (FIT) 205 provides a record of the locations of the valid data groups for a file to be identified, in offset address order. A set of FIT entries for a file is known as a FIT record, and is specified by an entry in the directory 203.

The FIT 205 has two components, an active file index block 207 and one or more inactive file index table blocks 209. The FIT records for active files within the direct data file device are located in the active file index block 207. As described below, this is indirectly addressed by the directory 203, which allows modifications to be made to FIT records for active files without having to update entries in the directory 203 for those files. For inactive files, the FIT records are directly addressed by the file directory 203 in the inactive file index blocks 209. In either case, the FIT records designate the location of data groups 211 that make up the files individually designated by an unique FileID 201. Each data group may be programmed with a header, containing the fileID of the file of which it is part, for cross reference purposes. The FIT record of a file may be modified, as indicated at 213 of FIG. 18, such as may be required after reclaiming a block in which data of the file are stored.

Figure 19:
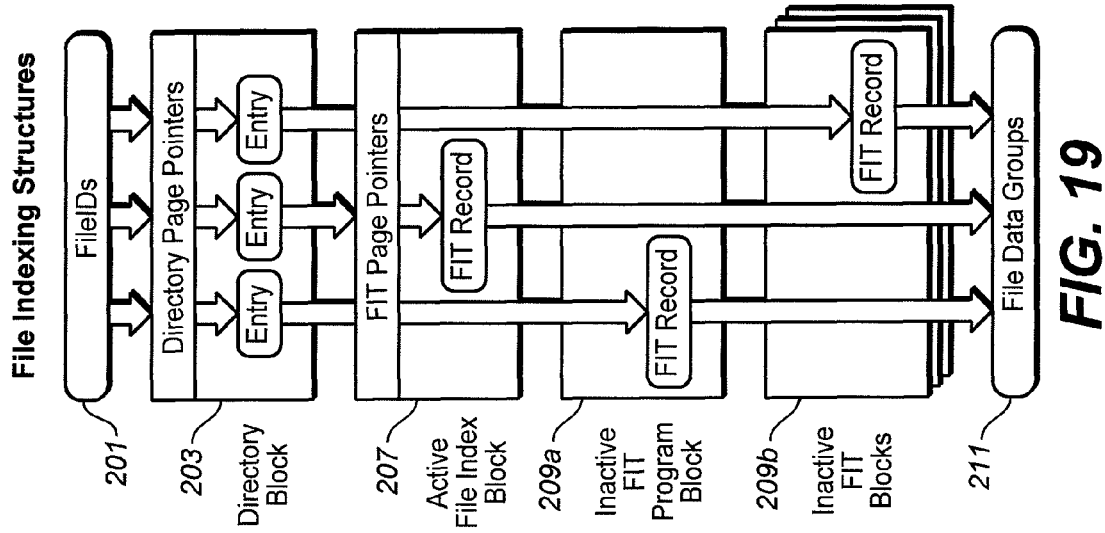
FIG. 19 expands the illustration of FIG. 18.

A somewhat expanded view of FIG. 18 is shown in FIG. 19, where common components are identified by the same reference numbers. Multiple inactive file index blocks 209 are shown. An inactive FIT program block 209a has erased memory pages into which new FIT records of newly written data files may be written. Once this block becomes full, it is then designated as an inactive file FIT block 209b, and a new erased block is designated as the inactive FIT program block. The file directory 203 typically points, for each FileID maintained in the system, to FIT records in all of the FIT blocks 207, 209a and 209b.

Whether FIT records of a particular file are stored in the active file index block 207 or one of the inactive file index blocks 209 depends upon whether the file is highly likely to be modified in the near future or not. If so, it is considered to be an active file whose FIT records are kept in the block 207, and, if not, an inactive file whose FIT records are kept in one of the blocks 209. When the memory system is operating with a host system that sends it "open file" and "close file" commands, then the memory may consider all open files to be active and all closed files to be inactive. A host using these commands typically maintains a number of open files that do not exceed a predetermined number, such as five. Data written by the host to its open files therefore have its FIT records stored in the block 207, while FIT records for closed files are stored in one of the blocks 209.

Some hosts, however, do not send open and close file commands to the memory system. In this case, the memory system determines whether a file is highly likely to be modified in the near future by monitoring the host's writing of data to the file. If a new data group written by the host ends somewhere intermediate of the beginning and end of a storage block, then it may be considered most likely that the host has ended writing data to that file, at least for a time. However, if a new data group ends coincident with an end of a storage block, then it may be considered more likely that the host has more data to write to the file. In this case, the memory system most likely defined the data group to end coincident with an end of the storage block, so is not an indication that the host has completed writing data for the file.

Figure 20:
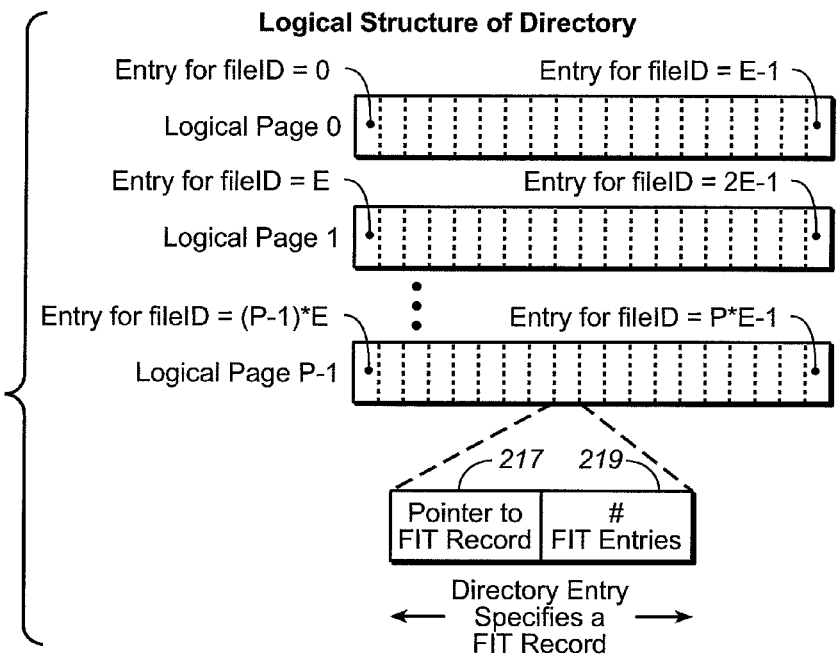
FIG. 20 gives an example logical structure of the file directory of FIGS. 18 and 19.

The file directory 203 in a direct data file interface system contains one entry for each fileID supported by the system. The directory is organized as a set of contiguous entries corresponding to the sequential fileID values supported by the device. The entry for a specified fileID can be directly accessed as a specific entry number within a specific logical page, as shown in FIG. 20. No directory search is required to locate the entry for a specified fileID.

A directory entry specifies the location of the FIT record containing the indexing information for the data for a file, together with the number of FIT entries that make up the FIT record. This is shown in FIG. 20 by fields 217 and 219, respectively. If the contents of the field 217 points to a record of an inactive file, it contains a physical address of a location in one of the blocks 209 where a FIT record for the file is stored. However, if the file is active, the field 217 contains a logical address that points to an intermediate location that remains the same as the FIT entries for the file are updated or changed, as explained hereinafter.

The directory comprises P logical pages, and each page comprises E directory entries. The directory therefore has capacity for P*E files. The directory is stored in one or more blocks dedicated to the purpose. If D directory blocks exist, each contains P/D logical pages and has capacity for P/D*E files. The directory blocks are designated DIR0 to DIR(D-1), in accordance with the ranges of logical pages they contain. The number of directory blocks is determined by the maximum number of files that have concurrently existed in the device. A directory block is added if the existing blocks do not contain an entry for a fileID that is to be assigned. However, the directory may be compacted if the number of files to be supported decreases.

Figure 21:
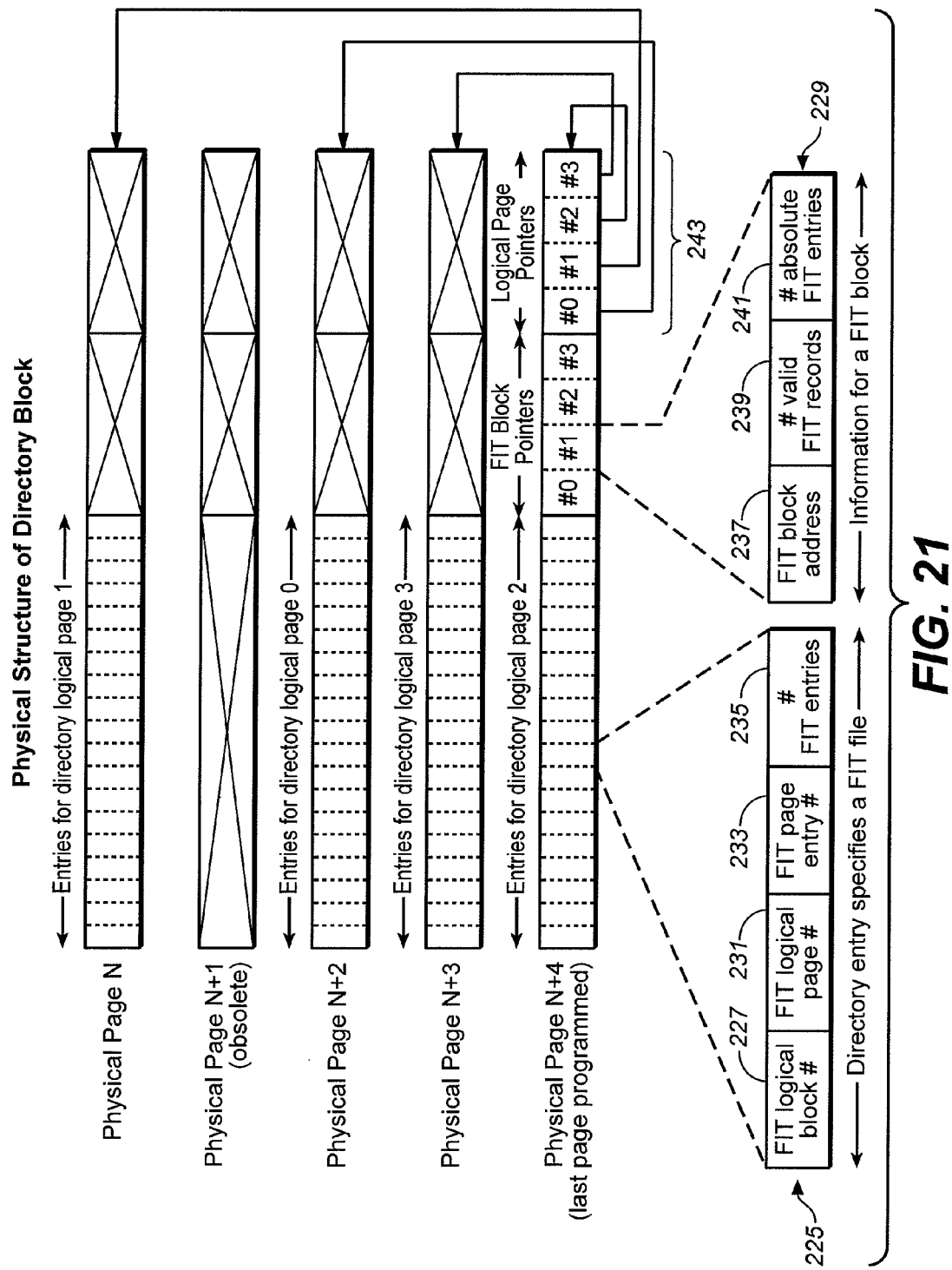
FIG. 21 illustrates a physical structure of a memory block containing the file directory of FIGS. 18 and 19.

An example physical structure that may be utilized for directory blocks that allows logical pages to be updated is illustrated by FIG. 21. Each entry (between adjacent vertical dotted lines) contains either a specification of the FIT record for the fileID, or a nul value indicating that a file does not exist for that filed. When the number of data groups containing data for a file exceeds the maximum number of FIT entries permitted in a FIT record, a continuation fileID may be allocated for the file, to allow a continuation FIT record to be used. The continuation fileID is specified within the directory entry for the primary fileID allocated to the file. The directory is located in one or more blocks dedicated to the purpose. The physical location of directory blocks is defined in the directory block list in a control log of a control block.

An illustration of a directory entry 225 is given in FIG. 21. It has the following four fields:

1) FIT logical block # (227): This field identifies the FIT logical block number in which the FIT record for the target fileID is located. The corresponding physical block address is defined by one of the FIT block pointers in the directory block, an example physical pointer 229 being illustrated in FIG. 21. The field 227 points to one of the FIT block pointers. FIT logical block N is reserved for the active file index block. A value of 0 for the FIT logical block number signifies that the file does not exist in the device.

2) FIT logical page # (231): This field identifies the logical page number in the active file index block 207 or an inactive FIT block 209 (FIG. 19), within which the FIT record for the target fileID is located. Where the FIT record is stored in the active file index block 207 (FIG. 19), it is an indirect address for the page in which the record is located. In the case of the inactive FIT program block 209a or inactive FIT blocks 209b, it is a direct physical address for the page.

3) FIT page entry # (233): This field identifies the sequential entry number within the page, at which the FIT record for the target fileID starts.

4) # FIT entries (235): When the leading bit within this field is zero, the field specifies the number of FIT entries within the FIT record for the target fileID. When the leading bit within this field is one, the number of FIT entries for the target fileID exceeds the maximum number of FIT entries permitted in a FIT record. In this case, the field specifies a continuation fileID to be used for the file. In the directory entry for the continuation fileID, this field specifies the total number of FIT entries within the FIT records for both the target and continuation fileIDs.

The FIT block pointers of FIG. 21, an example being pointer 229, specify each of the FIT logical blocks that exist in the device. They are valid only in the last programmed page in the directory block. A FIT block pointer exists for each FIT logical block # that may exist in the device. The following three fields exist in a FIT block pointer:

1) FIT block address (237): This field specifies the physical block address currently allocated to the FIT logical block # of field 227 of the directory entry 225.

2) # valid FIT records (239): This field specifies the number of valid files that exist in a FIT logical block.

3) # obsolete FIT entries (241): This field specifies the number of obsolete FIT entries that exist in a FIT logical block.

Directory logical page pointers 243 (FIG. 21) act as a logical-to-physical page map for the directory block. One pointer exists for each logical page in the block, and specifies the current physical page address for the logical page. The directory page pointer entries are only valid in the most recently programmed physical page in the directory block.

The directory may be updated in units of a logical page. Any number of the entries within a logical page may be updated in a single programming operation. A page may be read, one or more entries may be updated, and the page may be re-programmed in the next available erased page in the directory block. The directory page pointers and FIT block pointers are reprogrammed at the same time, to specify current values for all fields.

When the last page in the directory block has been programmed, the block is compacted and rewritten in an erased block, which becomes the new directory block. Compaction is performed by copying all valid pages, as defined by the directory page pointers, to the erased block, before erasure of the obsolete directory block.

The file index table (FIT) to which the file directory points includes a string of FIT entries, where each FIT entry identifies the file offset address and the physical location in flash memory of a data group. The FIT preferably contains entries for all valid data groups for files stored in the device. Obsolete data groups need not be indexed by the FIT. A set of FIT entries for data groups in a file is maintained as consecutive entries, in file offset address order. The set of entries is known as a FIT record. The FIT is maintained in a set of FIT blocks together with an index block for active files. The number of FIT blocks will vary, depending on the number of data groups in the device. New FIT blocks will be created and FIT blocks eliminated during operation of the device.

Figure 22:
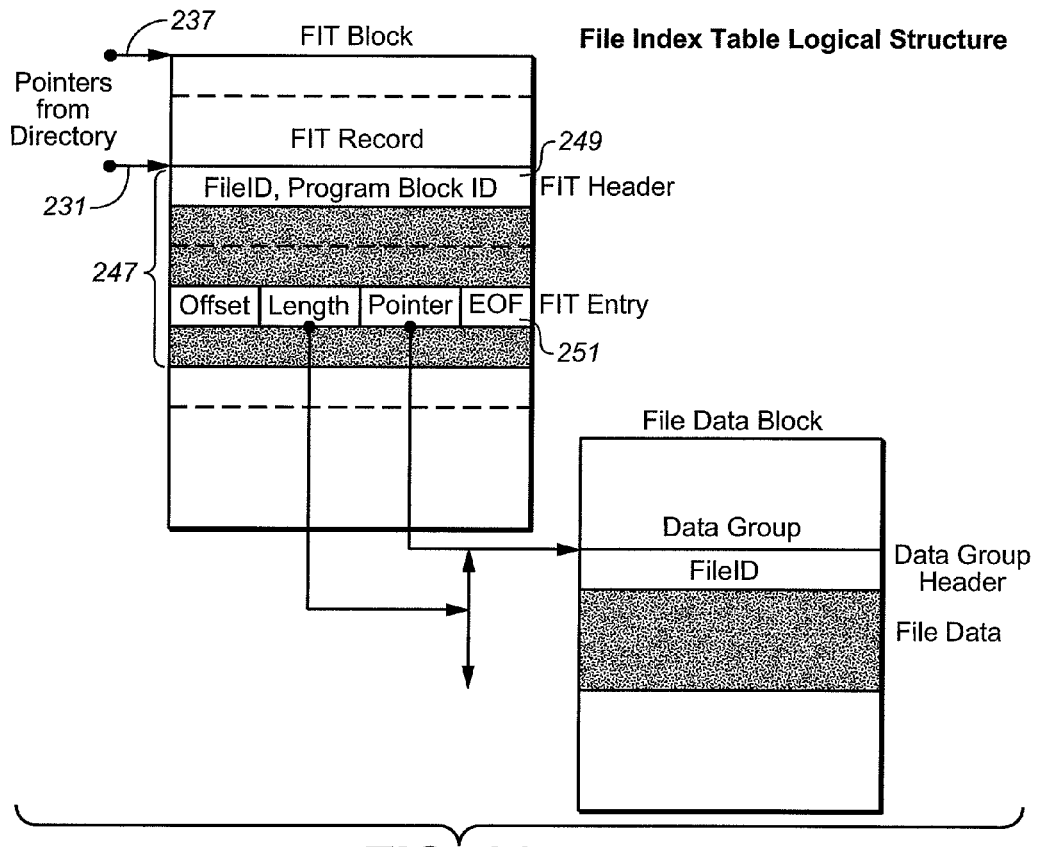
FIG. 22 shows the logical structure of the FIT of FIGS. 18 and 19.

An example of a logical structure of a FIT is given in FIG. 22. A FIT record 247 of a particular file is reached by the FIT block address 237 and FIT logical page #231 (FIG. 21) of the directory entry for the file. Individual FIT records comprise a set of contiguous FIT entries for the data groups within the file. The entries in the set are preferably consecutive and in order of file offset address.

Each FIT record of a file preferably includes a FIT header 249 (FIG. 22) as the first entry of a FIT record. The FIT header has a fixed length equal to an integral number of FIT entries. The FIT header has three fields, as follows:

1) FileID: The fileID identifies the entry for the file in the directory.

2) Program Block: The current physical location of the program block for a file is recorded in the FIT header whenever an updated version of the FIT record is written in the FIT. This is used to locate the program block for a file, when the file is re-opened by the host. It may also be used to validate the correspondence between a FIT record and the program block for the file, which has been selected for program block consolidation.

3) Program Pointer: The current value of the program pointer within the program block for a file is recorded in the FIT header whenever an updated version of the FIT record is written in the FIT. This is used to define the location for programming data within the program block for a file, when the file is re-opened by the host, or when the program block has been selected for program block consolidation.

A FIT record of a file typically has a number of additional entries that specify the physical location of the data groups making up the file. One FIT entry 251 is illustrated in FIG. 22, among others, for an example file. An individual FIT entry has four fields, as follows:

1) Offset Address: The offset address is the offset in bytes within the file relating to the first byte of the data group.

2) Length: This defines the length in bytes of file data within the data group. The length of the complete data group is longer than this value by the length of the data group header.

3) Pointer: This is a pointer to the location in a flash block of the start of the data group. The pointer has the following two sub-fields: (1) block address, defining the physical block containing the data group, and (2) byte address, defining the byte offset within the block of the start of the data group. This address contains the data group header.

4) EOF Flag: The EOF flag is a single bit that identifies the data group that is at the end of the data file.

Figure 23:
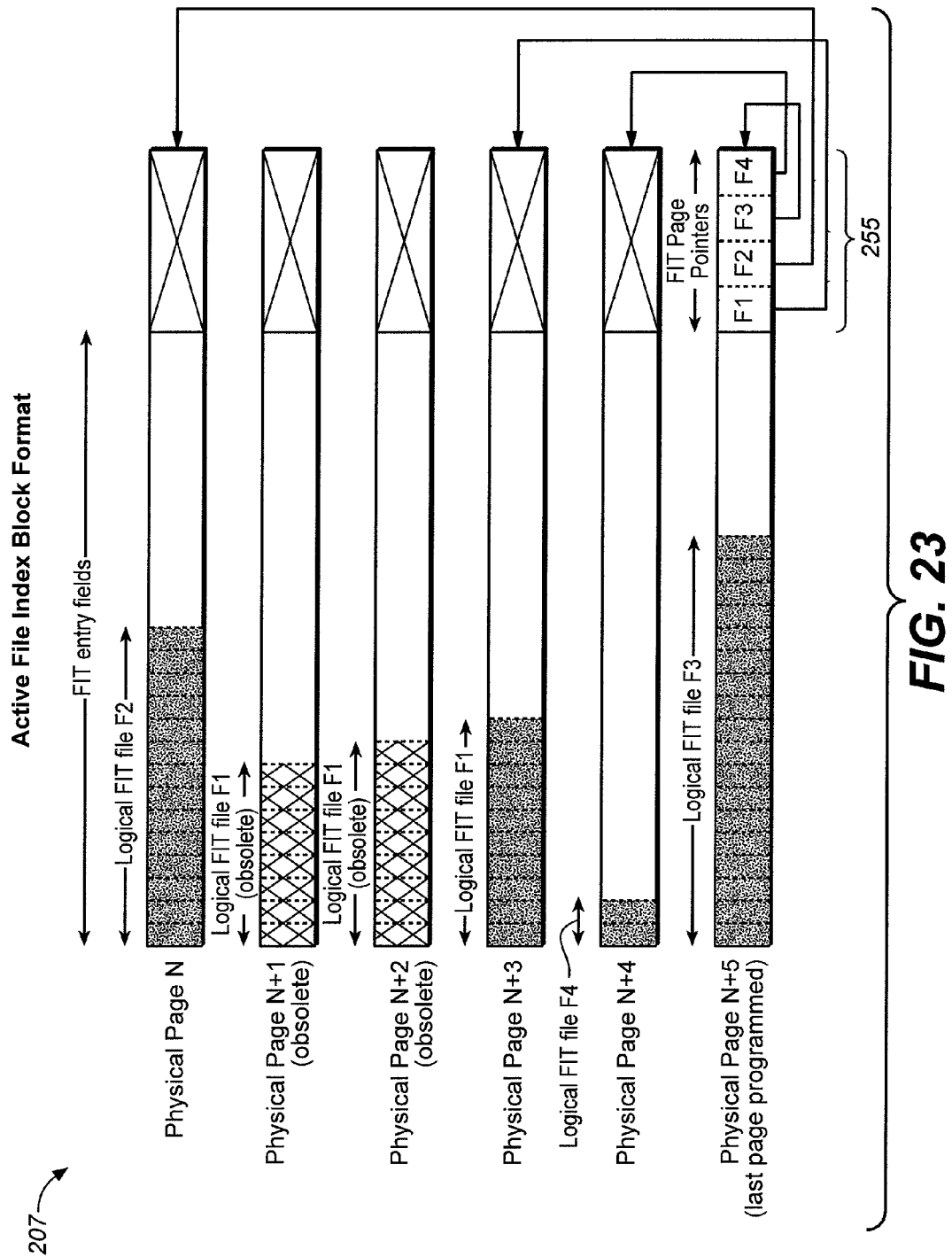
FIG. 23 illustrates a physical structure of a block containing FIT entries for active files (TFIT)

FIG. 23 illustrates the physical format of the active file index block 207 (FIGS. 18 and 19). Updates to FIT records of active files are made within an index block dedicated to active files. Only a single FIT record of one or more entries is stored per page of the block, and indirect addressing of logical FIT records is employed, to allow FIT records to be updated easily in the active file index block. When a logical FIT record is updated, it is rewritten in its entirety in the next available erased page, and a set of FIT page pointers in this most-recently programmed page provide logical page to physical page mapping. One logical FIT record exists for each concurrently active file in the system.

The FIT logical page #231 (FIG. 21) in the file directory entry for a file, as described above, specifies a logical FIT record, when the corresponding FIT logical block #227 in the directory entry relates to the active file index block. A logical FIT record may be updated and rewritten in the active file index block, without the need to update the file directory entry for the file. The FIT logical page #231 is an indirect address for the FIT record, and is mapped to a physical page by one of the set of FIT logical page pointers 255 that is updated and rewritten as part of the page containing the updated FIT record.

A set of FIT page pointers 255 (FIG. 23) in the most recently programmed page in the active file index block 207 specifies the physical pages in which the valid versions of logical FIT records are located. A nul value for a FIT page pointer signifies that a FIT logical page # in the active file index block has not been allocated. One FIT page pointer field exists for each active file that may exist concurrently in the device.

When the last page in the active file index block has been programmed, the block is compacted and rewritten in an erased block, which becomes the new active file index block. Compaction is performed by copying all valid pages, as defined by the FIT page pointers, to the erased block, before erasure of the obsolete active file program block.

When an active file becomes inactive by being closed or otherwise, its FIT record is copied into an inactive FIT program block described below, and the data of the FIT record in the active FIT block become obsolete.

Figure 24:
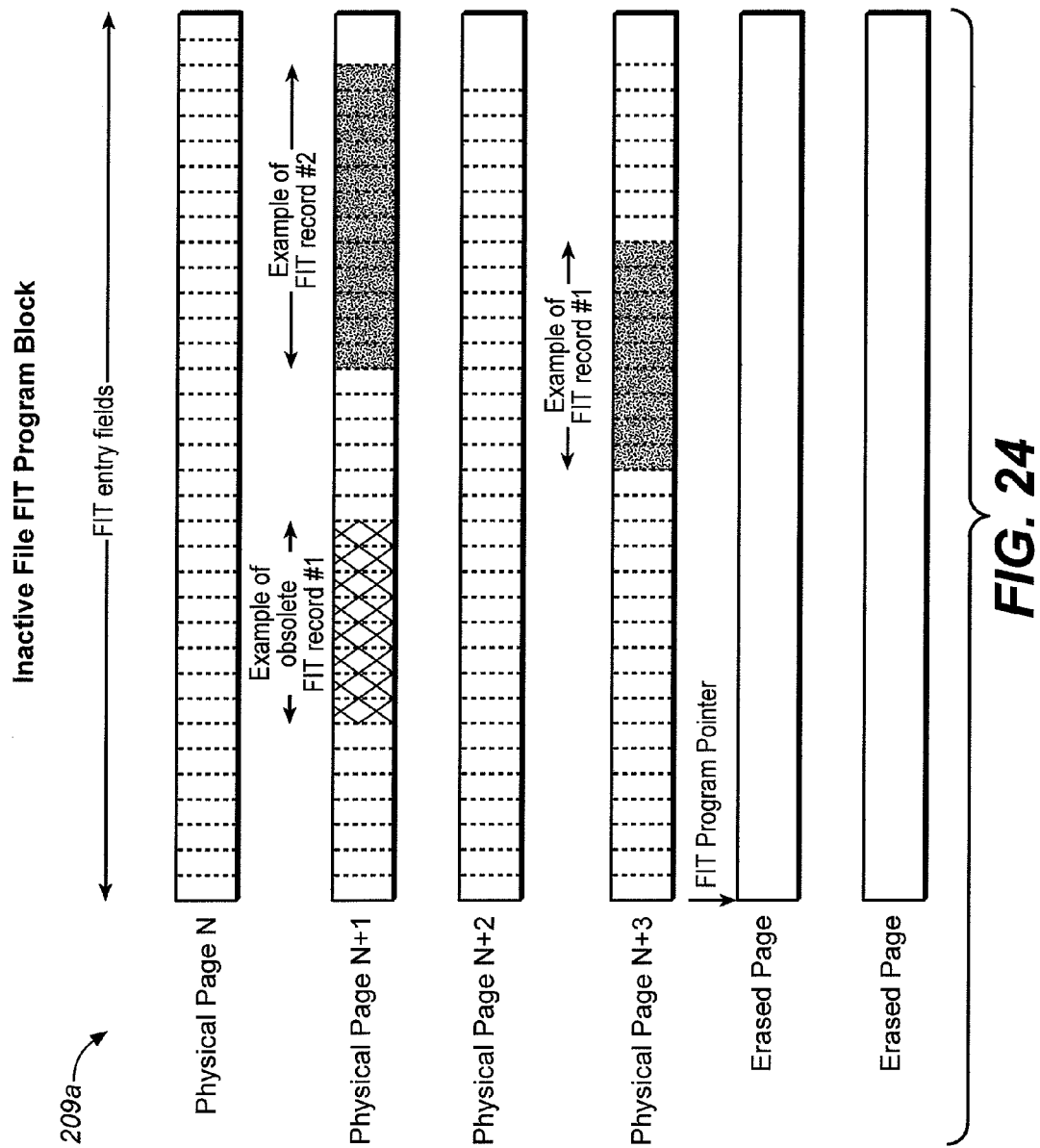
FIG. 24 illustrates a physical structure of a block containing FIT entries for inactive files.

Inactive FIT blocks provide storage of FIT records for all data files stored in the memory system, other than for currently active files. A single FIT program block provides the means for programming FIT records in FIT blocks. Referring to FIG. 24, details of the inactive file FIT program block 209a (FIG. 19) are given. When all pages in the inactive FIT program block have been programmed, it becomes an inactive FIT block 209b, and an erased block is allocated as a new inactive FIT program block.

As shown in FIG. 24, each FIT record in the inactive FIT program block is addressed directly from the directory. The FIT logical page #231 (FIG. 21) in a directory entry points directly to a physical page in the inactive FIT program block, and the FIT page entry #233 in a directory entry identifies the start of a FIT record. Multiple FIT records may be stored in a single page in the inactive FIT program block.

It is preferably required that all FIT records within a page in the inactive FIT program block of FIG. 24 have directory entries within the same logical page of the directory as shown in FIG. 20. This allows directory entries for all FIT records in an inactive FIT program block page to be updated with a single program operation in the directory block.

When a file becomes active by being opened or otherwise, and a FIT record for it is created in the active file index block, or a file is deleted, any FIT record that may exist for it in the inactive FIT program block becomes obsolete.

An inactive FIT block 209b (FIG. 19) is created when the last page of the inactive FIT program block of FIG. 24 has been programmed.

Figure 25:
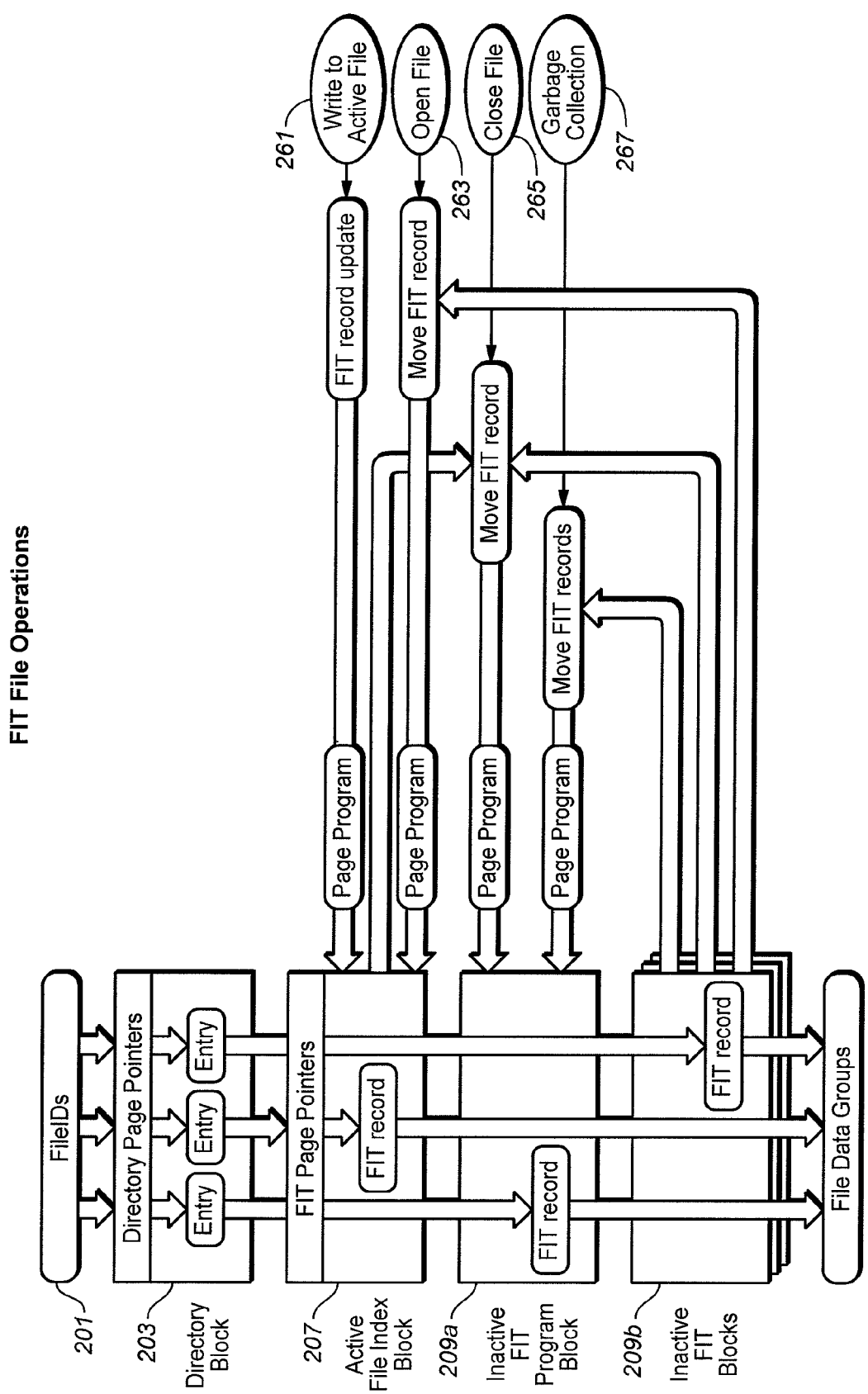
FIG. 25 shows operations performed on FIT records in the file indexing example of FIG. 19.

FIG. 25 provides an example of operations on FIT records. One such operation 261 causes data to be written to an active file. An algorithm for programming file data calls for updates to be made to the FIT from time to time when data is being written to an active file. The updated FIT record for the file being written is programmed into the active file index block 207. The directory entry for the file need not be updated, because an indirect addressing scheme is used for logical FIT records in the active file index block, as shown in FIG. 23 and described above.

When either an existing inactive data file or a new data file is opened or otherwise made active, shown in FIG. 25 as a function 263, a logical FIT record is allocated in the active file index block 207 by writing a pointer for it in the FIT page pointers field in the block (see FIG. 23). If the file is an existing file, its FIT record is also moved to the active file index block 207 from its existing location in a FIT block 209b or the FIT program block 209a. The FIT page pointer field and the FIT record may be written with a single page program operation in the active file index block 207. Only a single page needs to be updated in the directory, to update the directory entry for the file that has been opened or otherwise rendered active.

The closing of a data file is indicated at 265 of FIG. 25. When an active file becomes inactive by being closed or otherwise, its FIT record is moved from the active file index block 207 to the FIT program block 209a. When the page containing this FIT record is being programmed in the FIT program block 209a, as many as possible FIT records relating to the same directory page are preferably moved from FIT blocks to the same page of the FIT program block 209a. This provides a garbage collection mechanism for FIT blocks containing obsolete FIT entries. The source FIT blocks for moving such FIT records should be selected according to the number of obsolete FIT entries they already contain. Highest priority is given to FIT blocks with the highest number of obsolete FIT entries. FIT records are preferably not be moved from FIT blocks containing less than a predefined number of obsolete FIT entries.

The number of obsolete FIT entries in a FIT block is defined in the FIT block pointers field in the last programmed directory page. A directory page should be programmed to update entries for FIT records that have been moved, and update parameters in the FIT block pointers and directory page pointers fields. An active file index block page should be programmed, to insert a nul entry in the FIT page pointers for the logical FIT record that has been moved out of the block.

A garbage collection operation 267 (FIG. 25) can relate to either garbage collection of a FIT block, or garbage collection of a data file or a data block. First, garbage collection of one of the FIT Blocks 209b is discussed. Erase operations on FIT blocks are required from time to time to recover capacity occupied by obsolete FIT entries. All valid FIT records are moved from a FIT block 209b to the FIT program block 209a prior to erasure of the FIT block. The process described above to render an file inactive may not give the opportunity for all valid FIT records to be moved. It is therefore desired to perform a FIT garbage collection process to move all valid FIT records from the FIT block that is to be erased.

The FIT block with the highest number of obsolete FIT entries is preferably designated as the FIT garbage collection block, and FIT garbage collection operations should then be performed on this block until all valid FIT records have been moved. Another FIT block is then designated as the FIT garbage collection block. A page of the FIT garbage collection block is selected to be moved to the FIT program block, and the page is then filled with other FIT records from the FIT garbage collection block that relate to the same directory page, if available. If space remains in the page to be programmed, it may be further filled with FIT records from other FIT blocks. Selection of other FIT records to be moved with the selected page should be made on the basis of the entries in the relevant directory page.

A directory page is preferably programmed to update entries for FIT records that have been moved, and update parameters in the FIT block pointers and directory page pointers fields. FIT garbage collection operations are desirably scheduled to occur periodically, at the same time as data garbage collection operations. One page program operation for FIT garbage collection is performed for every N page program operations for data garbage collection.

Garbage collection 267 of a data file or data block will now be described. A data garbage collection operation can result in a need to update a FIT record for a file that is closed or otherwise inactive. This is achieved by moving the FIT record from a FIT block to the FIT program block, with the required update incorporated. The page being programmed in the FIT program block is preferably filled with other FIT records relating to the same directory page.

Second Specific File Indexing Embodiment

Data are written to a direct data file memory system in file objects identified by a fileID and the file is addressed by a logical offset address within the file object. Data are stored as a set of data groups, each with contiguous logical offset addresses and contiguous physical locations. File indexing correlates fileID and logical offset address with the locations of data groups.

A directory directly defines the locations in a file index table (FIT) of index entries for file objects. Direct indexing is normally used but an indirect indexing scheme is also used to allow indexing entries for some files to be frequently modified without consequent need to modify the file directory. The file indexing also supports storage of file attribute information separately from file data.

A file within a DFS device is a data object that has a single logical identity. A file is identified by a numerical fileID, and data within a file is identified by an offset address.

A fileID value is assigned by the DFS device in response to a command from a host to create a file object. File indexing is performed by a DFS system to track the physical location of data within each file object and of attributes for each file object.

Figure 26:
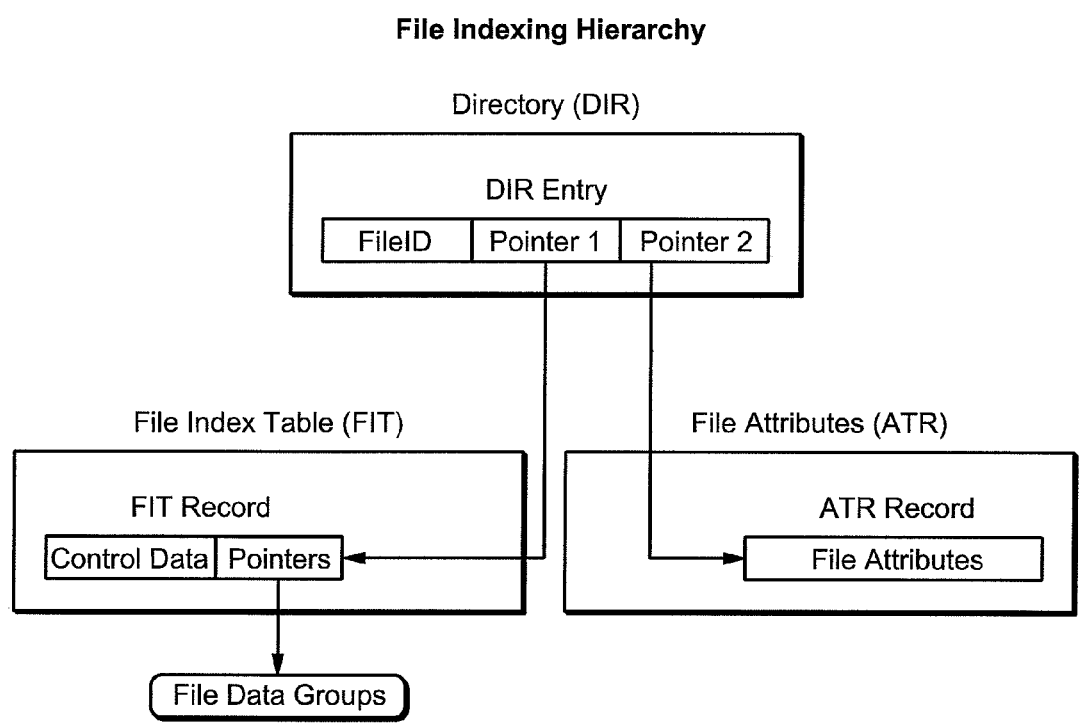
FIG. 26 illustrates the hierarchy of file indexing according to a second specific file indexing embodiment.

The hierarchy of file indexing is shown in FIG. 26. A directory entry for a file includes three primary fields, the unique FileID and two pointers to other addresses within the memory. Pointer 1 points to a FIT record for the file with that FileID in a FIT, and pointer 2 points to a file attribute record (ATR) for the file. The directory, FIT, and ATR are preferably stored in separate sets of blocks in flash memory.

The directory contains one entry for each file object that exists in the device. The entries are stored in non-overlapping ranges of fileID values, with each range allocated to a separate page. Entries within a range are ordered according to fileID value. The directory entry for a target fileID can be found by reading a single page and performing a binary search within the page.

The file index table (FIT) is directly addressed by entries in the directory, in order to minimize the space it occupies. It comprises a collection of records, each describing a file object, organized in pages. A page of records in the FIT is updated by a read/modify/write operation that moves the page to an un-programmed location in the same or another FIT block. Records in a page in the FIT all relate to entries in the same page in the directory, and a FIT page may therefore be updated with consequent need for modification of only a single directory page.

A separate temporary file index table (TFIT) block is used to store FIT records that are likely to be modified in the near future. Records for file objects are stored in logical pages in the TFIT and are indirectly addressed by directory entries. A record in the TFIT can be modified without the need to update the directory.

File attribute records (ATR) are stored for file objects identified by fileID. The contents of attribute records are defined by a host system, and are not interpreted by the memory system. Generally, the host may be allowed to store in ATRs whatever attributes of the file objects that are deemed to be important or useful in the operation of the host with the memory system. The indexing scheme for file attributes is the same as is used for the file index table.

Figure 27:
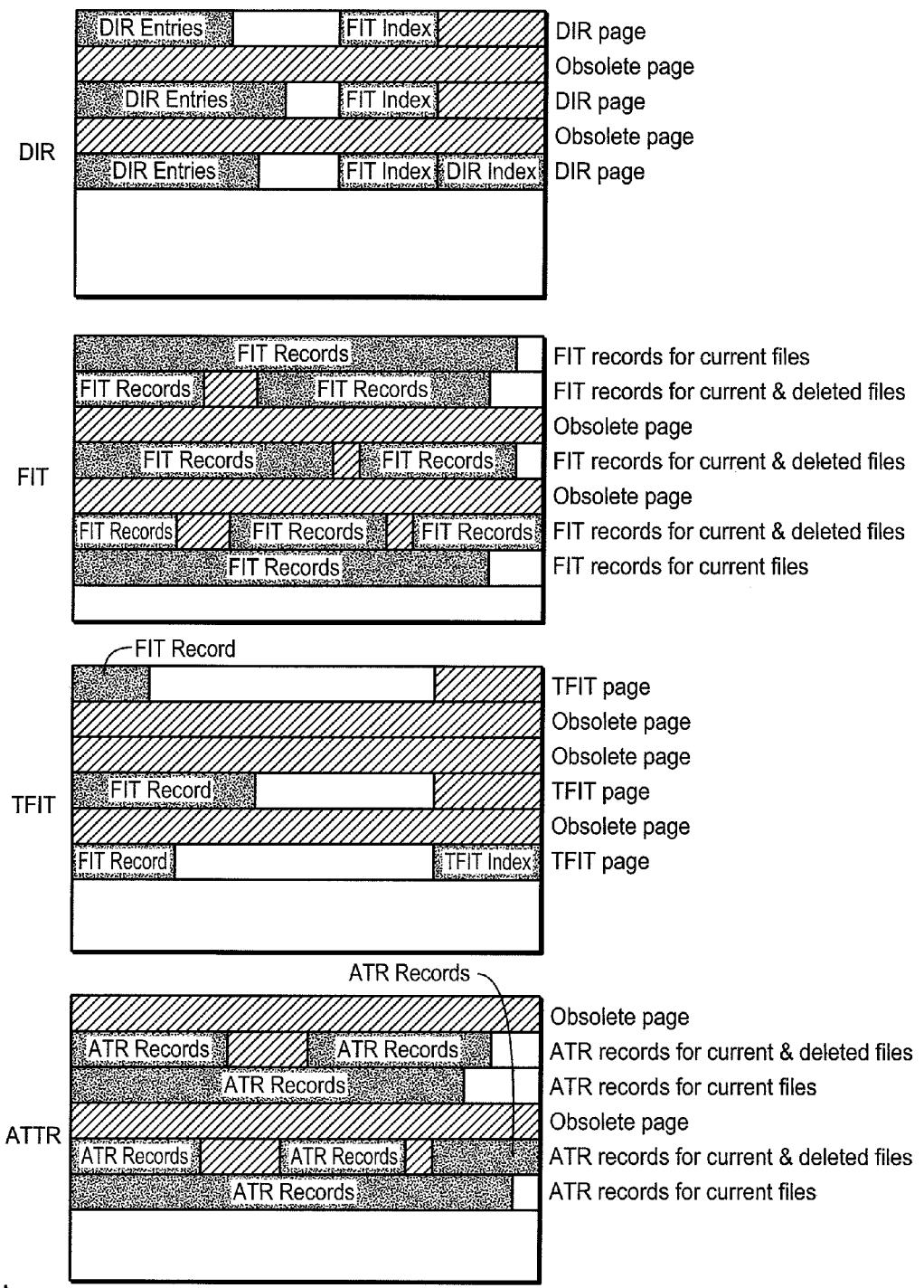
FIG. 27 shows example data structures in memory blocks dedicated to the file directory, FIT and table of file attributes in the embodiment of FIG. 26.

A set of exemplary file indexing structures used in a direct data file memory system are shown in FIG. 27. The file directory DIR includes a collection of entries describing a file object identified by a filed. One entry exists in the DIR for each file object that exists in the memory system. The DIR is contained in one or more dedicated DIR blocks.

Each DIR block contains a fixed number of logical pages, each of which may be updated by re-writing it to the next available physical page. A page containing valid DIR entries is allocated a logical page number. The number of logical pages in a DIR block is specified as being 25% of the number of physical pages in a block.

After the last page of a DIR block has been written, the block is compacted by writing all valid pages to an erased block and erasing the original DIR block.

A DIR page contains a set of DIR entries, in order of their fileID values. Valid DIR entries occupy a contiguous set of entry locations in a DIR page, but need not fill the complete page. There are no obsolete entries within the set, and the fileID values need not be contiguous. The range of the fileID values in a DIR page does not overlap the range of fileID values in any other DIR page.

When an entry for a new file needs to be inserted, the DIR page with a fileID range that encompasses the fileID value for the new block is identified from the information in the DIR index. A new entry is inserted at the appropriate location in the fileID range, and the DIR page is re-written. When an entry must be removed, the DIR page is compacted without the entry and is re-written.

When an addition is to be made to a DIR page that has become full, a free logical page is allocated as a new DIR page and the fileID range of the DIR page that has become full is divided into two approximately equal non-overlapping ranges, which are written in the two available DIR pages.

When the aggregate number of valid entries in two DIR pages with adjacent fileID ranges drops below 70% of the number of entry locations in a DIR page, the ranges of the two DIR pages are consolidated and written in one of the two DIR pages. The other unused page then becomes a free logical page.

A DIR entry of the DIR block of FIG. 27 contains three fields:

1) FileID

2) Pointer to FIT record. A pointer defines the FIT page logical identifier and byte offset of the FIT record. The FIT page logical identifier identifies one of up to 16 separate FIT pages that may be referenced by entries in the same DIR page, in a specific example. It is converted to a physical block address and page number by the FIT index field within the DIR page containing the entry. The byte offset identifies the location of the FIT record within the identified FIT page. The pointer may alternatively point to the TFIT. A reserved bit within the pointer is set to signify that the FIT record resides in the TFIT and that the pointer defines a logical page in the TFIT.

3) Pointer to file attributes record. A pointer defines the ATR page logical identifier and byte offset of the ATR record. The ATR page logical identifier identifies one of up to 16 separate ATR pages that may be referenced by entries in the DIR page, in a specific example. It is converted to a physical block address and page number by the FIT index field within the DIR page containing the entry. The byte offset identifies the location of the ATR record within the identified ATR page.

A separate valid FIT index field exists in each valid DIR page. It is used to convert logical identifiers for FIT pages to physical block addresses and page numbers at which the FIT pages are located. It contains one entry for each logical identifier that is used within any entry in the page to point to a FIT record.

A valid DIR index field exists only in the most recently written DIR page. Information in the field in all previously written DIR pages is obsolete. Its purpose is to support the ordering of DIR entries and the mapping of logical pages to physical pages.

The DIR index contains an entry for each possible logical page, ordered according to logical page number. Each entry has three fields.

1. Allocation status flag for the logical page.
2. FileID relating to first entry in the page. This allows the range of fileID values in each DIR page to be established and cached.
3. Pointer to the physical page within the DIR to which the logical page is mapped.

The FIT of FIG. 27 includes a collection of records, each containing control data and file data indexing information for a file object identified by a fileID. One entry exists in either the FIT or the TFIT for each file object that exists in the device. FIT records for most file objects are stored in the FIT, and the TFIT contains FIT records only for file objects that have a high probability of being modified in the near future. FIT records in the FIT are directly addressed by DIR entries, and a DIR page must be modified when a FIT page is modified.

The FIT is contained in one or more dedicated FIT blocks. Only one FIT block contains unprogrammed pages into which FIT records may be written. All FIT record information is programmed at the next un-rogrammed page location in this block, which is identified by a FIT write pointer. When the last page in the block has been programmed, the FIT write pointer is moved to the first page of an erased block. FIT blocks may contain obsolete pages resulting from FIT pages having been rewritten, and obsolete FIT records within a valid FIT page that result from DIR entries having been removed. Obsolete capacity may be reclaimed from FIT blocks.

A FIT page contains a set of FIT records that are referenced by DIR entries within the same DIR page, in the same order as the entries in the DIR page. A DIR page may reference multiple FIT pages. Modification of a FIT page may therefore be made with consequent need for modification of only a single DIR page. A FIT page may be modified by reading the page, then updating or adding one or more FIT records. Any obsolete FIT records are removed by compacting the page, and the page is then programmed at a location identified by the FIT write pointer.

A FIT page header stores a reference to the DIR page with which a FIT page is associated, and the length of FIT record information within the FIT page. The FIT page header may also store a record of the number of obsolete pages existing in each of the FIT blocks at the time the FIT page was written. This information will typically only be valid in the most recently written FIT page header.

A FIT record of the FIT block of FIG. 27 contains the following fields:

1) FileID.
2) File state. As described in above-referenced U.S. patent application Ser. No. 11/382,224, this is a number from 0-9, each state designating a unique pre-defined combination of types of physical blocks that are allowed to contain data of the file.

Typically, when the state of a file changes, updating the FIT record is otherwise necessary because one or more data groups of that file have changed.

3) Address of active block for file.
4) Number of data groups in file.
5) One field for each data group in file, comprising:
   a) Logical offset in bytes within file.
   b) Length in bytes.
   c) Pointer to physical location.

The TFIT block of FIG. 27 is used to store FIT records that are temporary; that is, FIT records that have a high probability of being modified in the near future. As discussed with respect to the first embodiment, this can include open files in systems that utilize open and closed file commands, for example. FIT records in the TFIT are indirectly addressed by DIR entries, and a TFIT entry can be modified without the need to update the DIR.

The TFIT is contained in a single dedicated TFIT block containing a fixed number of logical pages, each of which may be updated by re-writing it to the next available physical page. A page containing a valid TFIT entry is allocated a logical page number. The number of logical pages in a TFIT block is specified as being 25% of the number of physical pages in a block.

After the last page of a TFIT block has been written, the block is compacted by writing all valid pages to an erased block and erasing the original TFIT block. A FIT record does not exist concurrently in both the FIT and the TFIT.

A TFIT page contains only one FIT record. The FIT record in the TFIT may be identical to that described above for the FIT block. A valid TFIT index field exists only in the most recently written TFIT page. Information in the field in all previously written TFIT pages is obsolete. Its purpose is to map logical pages to physical pages. The TFIT index contains an entry for each possible logical page, ordered according to logical page number. Each entry has two fields:

1. Allocation status flag for the logical page.
2. Pointer to the physical page within the TFIT to which the logical page is mapped.

The ATTR block of FIG. 27 is a collection of records, each containing attributes for a file object identified by a fileID. The contents of attribute records are defined by a host system, and are not interpreted by the memory system. One entry exists in the ATR for each file object for which attributes have been written by the host. ATR records in the ATTR block are directly addressed by DIR entries, and a DIR page is be modified when a ATR page is modified.

The ATR is contained in one or more dedicated ATTR blocks. Only one ATR block may contain unprogrammed pages into which ATR records may be written. ATTR blocks may contain obsolete pages resulting from ATR pages having been rewritten, and obsolete ATR records within a valid ATR page that result from files having been deleted.

A page of the ATTR block contains a set of ATR records that are referenced by DIR entries within the same DIR page, in the same order as the entries in the DIR page. A DIR page may reference multiple ATR pages. Modification of an ATR page may therefore be made with consequent need for modification of only a single DIR page.

An ATR page header stores a reference to the DIR page with which an ATR page is associated, and the length of ATR record information within the ATR page. The ATR page header may also store a record of the number of obsolete pages existing in each of the ATTR blocks at the time the ATR page was written. This information will typically only be valid in the most recently written ATR page header. An ATR record contains the following fields:

1) FileID.
2) Length of ATR record.
3) Content of ATR record. The contents of attributes records are defined by a host system, and are not interpreted by the DFS system.

As discussed above, a data group is a set of file data with contiguous logical offset addresses within a file, programmed at contiguous physical addresses in a single block. A file is frequently programmed as multiple data groups. A data group may have any length between one byte and one block. Each data group is preferably programmed with a header, containing the fileID for the file of which it is part.

FIT records are contained in one or more FIT blocks and are directly addressed by DIR entries. Only one FIT block will contain erased pages that are available for programming new or updated FIT records. In all other FIT blocks, all pages have been programmed, but the block may contain fully obsolete or partially obsolete pages.

Reclaim of this capacity occupied by obsolete FIT records is performed by designating one FIT block as the next block to be reclaimed, and progressively copying pages from this reclaim block to the page currently designated by the FIT write pointer, before erasing the block being reclaimed.

A reclaim block is selected when a previous reclaim process on a FIT block has been completed and the block has been erased. The FIT block with the highest number of obsolete pages is selected as the reclaim block. This value is recorded for each FIT block in the FIT page header of the most recently written FIT page. The FIT block containing the FIT write pointer should not be selected for reclaim. The selected FIT block remains as the reclaim block until the reclaim process has been completed and that block has been erased.

The process of reclaiming FIT blocks containing obsolete pages entails copying a small number of pages containing valid FIT records from the block to the page designated by the FIT write pointer, in individual bursts at scheduled intervals. The number of pages in a burst should be the number of pages contained in a metapage. Programming the pages at the FIT write pointer should be performed as a single programming operation on a metapage.

A burst copy operation of pages in the reclaim block should be scheduled at intervals defined by progression of the FIT write pointer through the number of page positions contained in 4 metapages. The write pointer is pointed to the first page in a physical metapage when a burst copy operation is scheduled.

The same reclaim process may be applied separately to ATTR blocks.

Embodiment Variations

In each of the two specific file indexing embodiments described above, pages of data from a host, FIT entries and directory entries are all stored in separate groups of one or more blocks. As a first variation to this arrangement, pages containing directory entries and pages containing FIT records may exist together in the same block. A plurality of logical pages in the block contain directory entries as shown in FIG. 20. A directory entry for a specific fileID has a known logical address within the block. Each logical page also contains a set of logical page pointers, as shown in FIG. 21. These act as a logical-to-physical page map for directory pages in the block. One pointer exists for each logical page in the block, and specifies the current physical page address for the logical page. FIT pages containing FIT records may also exist in the block. FIT pages are not assigned to logical pages, but are directly addressed at physical page locations by directory entries. When one or more FIT records in a FIT page need to be updated, the location of the FIT page is identified from the relevant directory entries, the page is read, the relevant records are modified, and the updated page is written at the next available unprogrammed page in the block. In order to update directory entries to directly address this new FIT page location, a single directory logical page is modified and programmed in the physical page location following that occupied by the updated FIT page. The logical page pointer for this directory page is also updated and programmed in the same operation. The logical page pointers for all logical pages in the block are valid only in the last written directory page in the block, which is always the last written page in the block.

Alternatively, a FIT page may also contain the set of logical page pointers, and a FIT page may be the last written page in the block.

In yet another variation to the arrangement described in the two specific file indexing embodiments, pages containing directory entries, pages containing FIT records, and pages containing data from a host may exist together in the same block. When data is written from a host, it is programmed in a plurality of contiguous physical pages in the block in the form of a data group. The location of this data group is identified by a field in the relevant FIT record in an updated FIT page, which is programmed in the physical page immediately following the end of the data group. A directory page is also programmed immediately after the FIT page, to update pointers to all FIT records in the updated FIT page, as described above.

A data group should not extend beyond the third last page in a block, to allow a FIT page and directory page to be programmed immediately after it.

CONCLUSION

Although the various aspects of the present invention have been described with respect to exemplary embodiments thereof, it will be understood that the present invention is entitled to protection within the fall scope of the appended claims.

It is claimed:

1. A method of operating a non-volatile memory system with data storage memory cells grouped into physical blocks of memory cells that are erased together prior to reprogramming with data of files received from outside the memory system, comprising:
receive data of files that are individually identified by a unique file identifier and offsets of data within the file,
store, in the memory blocks, data of the received files,
maintain, for individual files, records of the physical block locations of data of the individual files by their unique file identifiers and offsets of data within the individual files, maintain a classification of the individual files as either (1) likely to be modified in the near future or (2) not likely to be modified in the near future, maintain a directory of links to the records of the files by their unique file identifiers, by:

in response to a first file being classified as likely to be modified in the near future, causing the links for records of the first file to be indirect, and in response to a second file being classified as not likely to be modified in the near future, causing the links for records of the second file to be direct, access individual one of the records through the directory by use of the unique file identifiers, and read data of the received data files that are stored in those of the physical blocks of memory cells whose locations are maintained in the accessed records.

2. The method of claim 1, wherein a file is maintained in classification (1) while a host system to which the memory system is connected designates the individual file as opened, and wherein a file is maintained in classification (2) while the host system to which the memory system is connected designates the individual file as closed.

3. The method of claim 1, wherein the file classifications are maintained by the memory system in response to the writing of file data within at least one of the memory blocks from a host to which the memory system is attached.

4. The method of claim 1, wherein the indirect link to the record of the first file includes an entry in the directory of an address of a first location in the memory that does not change as a second location containing the record of the first file changes, and wherein the direct link to the record of the second the includes an entry in the directory of an address of a third location that changes as a fourth location containing the record of the second file changes.

5. The method of claim 1, wherein records of files classified as (1) are maintained in individual pages within the memory blocks without records of other files therein, and wherein multiple records of files classified as (2) are maintained in individual pages within the memory blocks.

6. The method of claim 1, wherein a number of records of files classified as (2) are grouped together in a first page of the memory blocks, and a number of links to those numbers of records are grouped together in a second page of the memory blocks forming the directory.

7. The method of claim 6, wherein the number of records of files classified as (2) stored in the first page are limited to files whose links are stored in the second page.

8. A method of operating a non-volatile memory system with data storage memory cells grouped into physical blocks of non-volatile memory cells that are erased together prior to reprogramming with data files received from outside of the memory system, comprising:

receiving data of files that are individually identified by a unique file identifier and offsets of data within the file, storing data of individual files in the blocks of non-volatile memory cells as one or more data groups, maintain records of the data groups that make up individual ones of the data files, the records including an address of the blocks of memory cells in which the data groups are stored, maintain a directory of links to the records by the unique file identifiers, the links being limited for inactive files to direct links and being limited for active files to indirect links, and read data of the received data files that are stored in those of the physical blocks of memory cells whose locations are maintained in the accessed records.

9. The method of claim 8, wherein active files are those likely to be modified in the near future, and inactive files are those not likely to be modified in the near future.

10. The method of claim 8, wherein active files include files designated by a host to which the memory system is connected as opened, and inactive files include files designated by the host as closed.

11. The method of claim 8, wherein the memory system identifies the individual files as active or inactive by monitoring at least one pattern of storage of the files within the memory blocks.

12. The method of claim 8, wherein the one or more data groups include data in contiguous logical file offset addresses and contiguous physical addresses within memory cell blocks.

13. The method of claim 8, wherein records of active files are maintained in individual pages within the memory blocks without records of other files therein, and wherein multiple records of inactive files are maintained in individual pages within the memory blocks.

14. The method of claim 8, wherein a number of records of inactive files are grouped together in a first page of the memory blocks, and a number of links to those numbers of records are grouped together in a second page of the memory blocks forming the directory.

15. A method of operating a non-volatile memory system with data storage memory cells grouped into physical blocks of non-volatile memory cells that are erased together prior to reprogramming pages of the blocks with data identified by a unique file identifier and an offset address within the file, comprising:

storing data of individual files in blocks of non-volatile memory cells as one or more data groups that individually specify data in contiguous logical file offset addresses and contiguous physical addresses within memory cell blocks, maintain a set of entries in a table of the data groups of the individual files by their unique file identifiers and offsets of data within the individual files, and maintain a file directory that links the files by their unique identifiers to the entries in the table of data groups of the files, the link being direct for data of closed files and indirect for data of open files.

16. The method of claim 15, wherein tables of open files are maintained in individual pages within the memory blocks without tables of other files therein, and wherein multiple records of closed files are maintained in individual pages within the memory blocks.

17. The method of claim 15, wherein a number of records of closed files are grouped together in a first page of the memory blocks, and a number of links to those numbers of records are grouped together in a second page of the memory blocks forming the directory.

* * * * *